(12) United States Patent
Fujisawa

(10) Patent No.: US 12,456,192 B2
(45) Date of Patent: Oct. 28, 2025

(54) MEDICAL IMAGE PROCESSING APPARATUS HAVING RESPIRATORY STATE ESTIMATING FUNCTION, MEDICAL IMAGE PROCESSING METHOD THEREOF, AND STORAGE MEDIUM USED IN THE SAME

(71) Applicant: CANON MEDICAL SYSTEMS CORPORATION, Otawara (JP)

(72) Inventor: Yasuko Fujisawa, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 437 days.

(21) Appl. No.: 18/051,073

(22) Filed: Oct. 31, 2022

(65) Prior Publication Data

US 2023/0196564 A1 Jun. 22, 2023

(30) Foreign Application Priority Data

Dec. 17, 2021 (JP) ................................. 2021-205514

(51) Int. Cl.
*G06T 7/00* (2017.01)
*G06T 5/50* (2006.01)
(Continued)

(52) U.S. Cl.
CPC .............. *G06T 7/0012* (2013.01); *G06T 5/50* (2013.01); *G06T 7/50* (2017.01); *G06T 7/60* (2013.01);
(Continued)

(58) Field of Classification Search
CPC ........... G06T 7/50; G06T 7/64; G06T 7/0012; G06T 2207/10081; G06T 2207/10116;
(Continued)

(56) References Cited

U.S. PATENT DOCUMENTS 7,206,462 B1 * 4/2007 Betke .................... G06T 7/0012
382/280
2005/0234331 A1 * 10/2005 Sendai ................... A61B 6/541
600/425
(Continued)

FOREIGN PATENT DOCUMENTS

JP 2005-312007 A 11/2005
JP 2013-176550 A 9/2013
(Continued)

OTHER PUBLICATIONS

Vidal, Franck P., and Pierre-Frederic Villard. "Development and validation of real-time simulation of X-ray imaging with respiratory motion." Computerized Medical Imaging and Graphics 49 (2016): 1-15. (Year: 2016).*
(Continued)

*Primary Examiner* — Sumati Lefkowitz
*Assistant Examiner* — Ryan P Potts
(74) *Attorney, Agent, or Firm* — Oblon, McClelland, Maier &Neustadt, L.L.P.

(57) ABSTRACT

A medical image processing apparatus of an embodiment includes processing circuitry. The processing circuitry acquires a medical image of a lung field of a patient, identifies anatomical regions constituting the thorax of the patient based on the medical image, estimates a respiratory state when the medical image has been captured based on the anatomical regions, and executes processing based on the respiratory state.

18 Claims, 10 Drawing Sheets

(51) Int. Cl.
  *G06T 7/50* (2017.01)
  *G06T 7/60* (2017.01)
  *G06T 7/64* (2017.01)
  *G06V 10/25* (2022.01)
  *G06V 10/74* (2022.01)
  *G16H 30/40* (2018.01)
  *G16H 40/63* (2018.01)
  *G16H 50/20* (2018.01)

(52) U.S. Cl.
  CPC ............... *G06T 7/64* (2017.01); *G06V 10/25* (2022.01); *G06V 10/761* (2022.01); *G16H 30/40* (2018.01); *G16H 40/63* (2018.01); *G06T 2207/10081* (2013.01); *G06T 2207/30061* (2013.01); *G06V 2201/03* (2022.01); *G16H 50/20* (2018.01)

(58) Field of Classification Search
  CPC . G06T 2207/30061; G06T 7/20; G06V 10/25; G06V 10/761; G06V 2201/03; A61B 5/08; A61B 5/0816; A61B 7/003; A61B 2017/00699
  See application file for complete search history.

(56) References Cited

U.S. PATENT DOCUMENTS

| | | |
|---|---|---|
| 2011/0060215 A1 | 3/2011 | Tupin, Jr. et al. |
| 2012/0308110 A1* | 12/2012 | Kim .......................... G06T 7/12 382/131 |
| 2013/0331725 A1* | 12/2013 | Noji ....................... A61B 5/087 600/534 |
| 2014/0064583 A1* | 3/2014 | Wang ..................... A61B 6/032 382/128 |
| 2015/0073765 A1* | 3/2015 | Boettger ................. G16Z 99/00 703/11 |
| 2017/0278239 A1* | 9/2017 | Fujiwara ............... G06T 7/0016 |
| 2019/0385015 A1* | 12/2019 | Miyajima ............. G06F 18/211 |

FOREIGN PATENT DOCUMENTS

| | | |
|---|---|---|
| JP | 2016-002251 A | 1/2016 |
| JP | 2017-196410 A | 11/2017 |
| JP | 2018-532515 A | 11/2018 |
| JP | 2021-083960 A | 6/2021 |
| WO | WO 2017/080868 A1 | 5/2017 |
| WO | WO-2021047941 A1 * | 3/2021 ............. A61B 5/113 |

OTHER PUBLICATIONS

Office Action issued Sep. 9, 2025, in corresponding Japanese Patent Application No. 2021-205514, citing documents 1 and 15-19 therein, 4 pages.

* cited by examiner

MEDICAL IMAGE PROCESSING APPARATUS HAVING RESPIRATORY STATE ESTIMATING FUNCTION, MEDICAL IMAGE PROCESSING METHOD THEREOF, AND STORAGE MEDIUM USED IN THE SAME

CROSS-REFERENCE TO RELATED APPLICATION

The present application claims priority based on Japanese Patent Application No. 2021-205514, filed Dec. 17, 2021, the content of which is incorporated herein by reference.

FIELD

Embodiments disclosed in the present description and drawings relate to a medical image processing apparatus, a medical image processing method, and a storage medium.

BACKGROUND

Conventionally, an X-ray computed tomography (CT) apparatus and the like have been used in the field of medical image diagnosis. For example, diagnosis of pneumonia, and the like are performed by imaging a patient's lung field with an X-ray CT apparatus. Generally, at the time of diagnosing pneumonia, diagnosis is performed using a CT image captured when a patient's respiration is in a maximum inspiratory state. However, some patients who are diagnosed with pneumonia, for example, have difficulty holding their breath or have difficulty breathing in until they reach their maximum inspiratory state, and thus a CT image may be captured when a patient's respiration is in an expiratory state. In such a case, for example, a doctor makes a diagnosis after ascertaining a patient's respiratory state at the time of imaging.

In recent years, for the purpose of supporting diagnosis of pneumonia, development of diagnosis support software using artificial intelligence (AI) has also been performed. Such diagnosis support software diagnoses whether or not a patient has pneumonia by comparing pixel values (CT values) of pixels (voxels) of a portion related to an imaged lung field with a threshold value of a CT value for determining presence or absence of pneumonia. Even in such diagnosis support software, a CT image captured for diagnosis must be captured in a state when a patient's respiration is in a maximum inspiratory state. However, as described above, captured CT images are not always CT images captured in a maximum inspiratory state. When a CT image has been captured when a patient's respiration is not in a maximum inspiratory state, a lung field parenchymal CT value shows a high CT value even if the patient is healthy. For this reason, if diagnosis is simply performed using the diagnosis support software using a CT value of the lung field in a CT image captured when a patient's respiration is not in a maximum inspiratory state, determination based on a threshold value is not performed correctly, and thus it is also conceivable that diagnosis of pneumonia cannot be made correctly. That is, it is also conceivable that the diagnosis support software makes a misdiagnosis such as regarding a healthy region as a pneumonia-affected region or regarding a pneumonia-affected region as a healthy region.

Accordingly, conventionally, proposals have been made regarding technology for estimating a patient's respiration phase and correcting CT values and pixel values not only in the field of diagnosis using CT images but also in the field of chest X-ray examination.

DETAILED DESCRIPTION

A medical image processing apparatus of an embodiment has processing circuitry. The processing circuitry acquires a medical image of the lung field of a patient, identifies an anatomical region forming the patient's thorax based on the medical image, estimates a respiratory state when the medical image is captured based on the anatomical region, and executes processing based on the respiratory state.

A medical image processing apparatus, a medical image processing method, and a storage medium according to embodiments will be described below with reference to the drawings. In the following description, an example of a case where the medical image processing apparatus is applied to an X-ray computed tomography (CT) apparatus for CT examination will be described.

Figure 1:
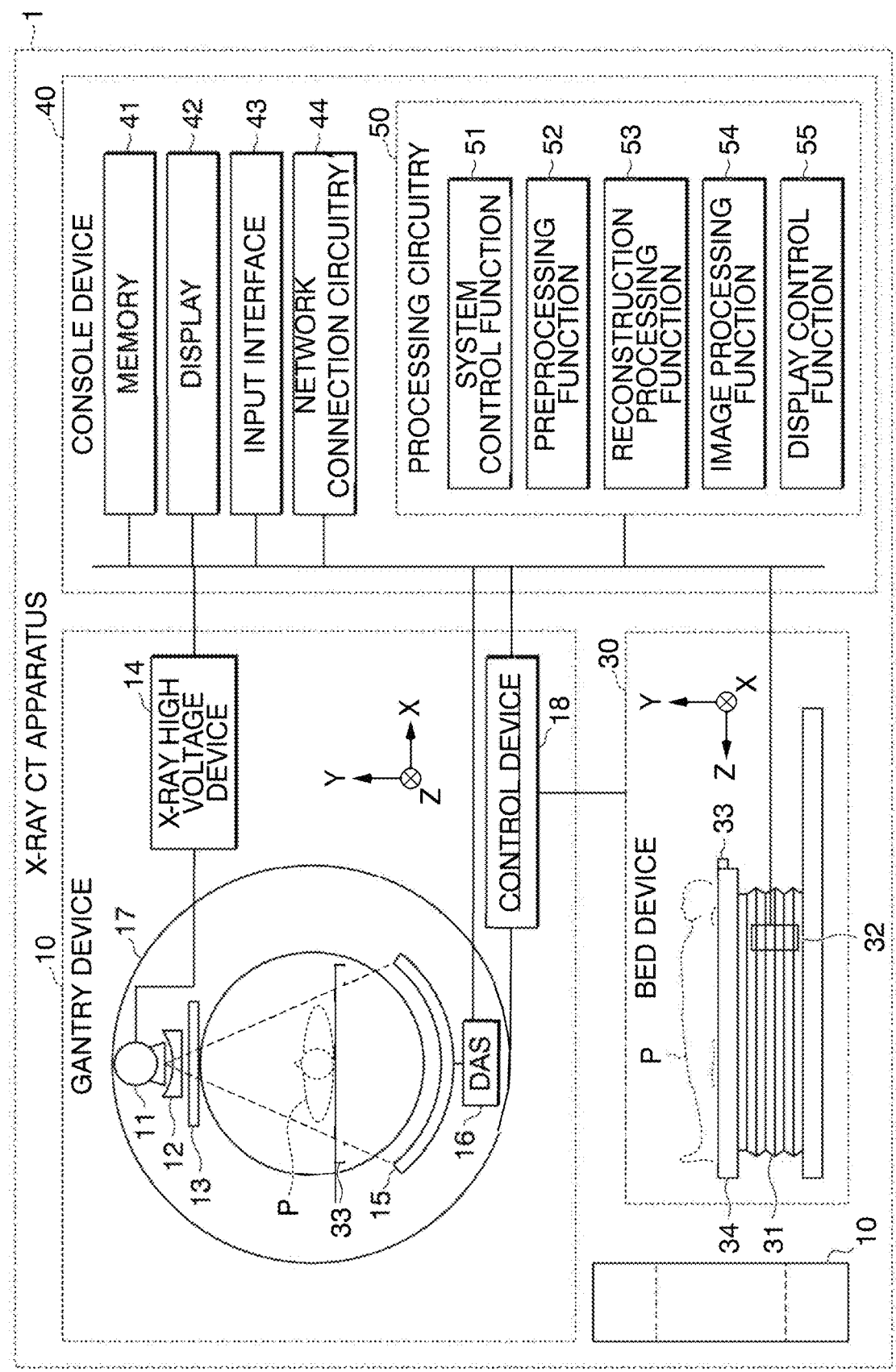
FIG. 1 is a diagram showing a configuration example of an X-ray CT apparatus equipped with a medical image processing apparatus according to an embodiment.

FIG. 1 is a diagram showing a configuration example of an X-ray CT apparatus equipped with the medical image processing apparatus according to an embodiment. The X-ray CT apparatus 1 is a medical diagnostic apparatus that radiates X-rays to a patient P who is a subject and detects X-rays that have passed through the patient P. The X-ray CT apparatus 1 generates and displays images such as reconstructed images (for example, CT images) according to the detected X-rays. Accordingly, an operator (a doctor, an engineer, or the like) who performs CT examination can visually check whether or not the patient P has a lesion.

The X-ray CT apparatus 1 includes a gantry device 10, a bed device 30, and a console device 40, for example. Although FIG. 1 shows the gantry device 10 both in a Z-axis direction and in an X-axis direction for convenience of explanation, the X-ray CT apparatus 1 includes one gantry device 10 in reality. In the present embodiment, the longitudinal direction of a central axis of a rotating frame 17 or a top plate 33 of the bed device 30 in a non-tilt state is defined as the Z-axis direction, an axis orthogonal to the Z-axis direction and parallel to a floor surface is defined as the X-axis direction, and a direction orthogonal to the Z-axis direction and perpendicular to the floor surface is defined as a Y-axis direction.

The gantry device 10 includes, for example, an X-ray tube device 11 containing an X-ray tube, a wedge 12, a collimator 13, an X-ray high voltage device 14, an X-ray detector 15, and a data acquisition system (hereinafter DAS) 16, the rotating frame 17, and a control device 18.

The X-ray tube device 11 generates X-rays by emitting, through the X-ray tube contained therein, thermoelectrons from a cathode (filament) toward an anode (target) according to a high tube voltage applied by the X-ray high voltage device 14. The X-ray tube device 11 includes, for example, a vacuum tube as the X-ray tube. In the following description, for ease of explanation, the X-ray tube device 11 is assumed to be an X-ray tube. The X-ray tube device 11 is, for example, a rotating anode type X-ray tube that generates X-rays by emitting thermoelectrons from a cathode to a rotating anode. X-rays generated by the X-ray tube device 11 are radiated to the patient P.

The wedge 12 is a filter for adjusting a dose (X-ray dose) at the time of radiating X-rays generated by the X-ray tube device 11 to the patient P. The wedge 12 attenuates X-rays passing through the wedge 12 such that a distribution of the dose of X-rays radiated to the patient P becomes a predetermined distribution. The wedge 12 is also called a wedge filter or a bow-tie filter. The wedge 12 is formed by, for example, processing aluminum such that it has a predetermined target angle and a predetermined thickness.

The collimator 13 is a mechanism for narrowing down a radiation range of X-rays transmitted through the wedge 12. The collimator 13 narrows down the X-ray radiation range by, for example, combining a plurality of lead plates to form a slit. The collimator 13 may be called an X-ray diaphragm. The collimator 13 may be an active collimator having a mechanically operable narrowing range.

The X-ray high voltage device 14 includes, for example, a high voltage generator and an X-ray controller. The high voltage generator has electric circuitry including a transformer, a rectifier, and the like and generates a high voltage to be applied to the X-ray tube device 11. The X-ray controller controls the output voltage of the high voltage generator according to an X-ray dose to be generated by the X-ray tube device 11. The high voltage generator may be one that boosts a voltage by the aforementioned transformer or one that boosts a voltage by an inverter. The X-ray high voltage device 14 may be provided on the rotating frame 17 or may be provided on the side of a stationary frame (not shown) provided on the gantry device 10.

The X-ray detector 15 detects the intensity of X-rays that are generated by the X-ray tube device 11, pass through the patient P, and are incident thereon. The X-ray detector 15 outputs an electrical signal (which may be an optical signal or the like) corresponding to the intensity of the detected X-rays to the DAS 16. The X-ray detector 15 has, for example, a plurality of X-ray detection element arrays. Each of the plurality of X-ray detection element arrays has a plurality of X-ray detection elements arranged in a channel direction along an arc having a focal point of the X-ray tube device 11 as a center. The plurality of X-ray detection element arrays are arranged in a slice direction (column direction, row direction).

The X-ray detector 15 is, for example, an indirect detector having a grid, a scintillator array, and a photosensor array. The scintillator array has a plurality of scintillators. Each scintillator has a scintillator crystal. The scintillator crystal emits an amount of light corresponding to the intensity of incident X-rays. The grid has an X-ray shielding plate arranged on the surface of the scintillator array on which X-rays are incident and having a function of absorbing scattered X-rays. The grid may be called a collimator (one-dimensional collimator or two-dimensional collimator). The photosensor array has, for example, photosensors such as photomultiplier tubes (PMTs). The photosensor array outputs an electrical signal corresponding to the amount of light emitted by the scintillator. The X-ray detector 15 may be a direct conversion type detector having a semiconductor element that converts incident X-rays into an electrical signal.

The DAS 16 includes, for example, an amplifier, an integrator, and an A/D converter. The amplifier amplifies an electrical signal output from each X-ray detection element of the X-ray detector 15. The integrator integrates the electrical signal amplified by the amplifier over a view period (which will be described later). The A/D converter converts an electrical signal representing the result of integration by the integrator into a digital signal. The DAS 16 outputs detection data based on the digital signal to the console device 40. The detection data is a digital value of X-ray intensity identified by a channel number and a row number of the X-ray detection element that is a generation source, and a view number indicating a collected view. The view number is a number that changes according to rotation of the rotating frame 17 and is a number that is incremented according to rotation of the rotating frame 17, for example. Therefore, the view number is information indicating a rotation angle of the X-ray tube device 11. A view period is a period that falls between a rotation angle corresponding to a certain view number and a rotation angle corresponding to the next view number. The DAS 16 may detect switching of views by a timing signal input from the control device 18, by an internal timer, or by a signal acquired from a sensor that is not shown. When the X-ray CT apparatus 1 performs full scanning and the X-ray tube device 11 continuously emits X-rays, the DAS 16 collects detection data groups for the entire circumference (360 degrees). When the X-ray CT apparatus 1 performs half-scanning and the X-ray tube device 11 continuously emits X-rays, the DAS 16 collects detection data for a half circumference (180 degrees).

The rotating frame 17 is an annular member that supports the X-ray tube device 11, the wedge 12, the collimator 13, and the X-ray detector 15 such that the X-ray tube device 11, the wedge 12, and the collimator 13 face the X-ray detector 15. The rotating frame 17 is rotatably supported by a stationary frame around the patient P introduced therein. The rotating frame 17 further supports the DAS 16. Detection data output by the DAS 16 is transmitted from a transmitter having a light-emitting diode (LED) provided on the rotating frame 17 to a receiver having a photodiode provided on a non-rotating part (for example, the stationary frame that is not shown) of the gantry device 10 through optical communication and forwarded by the receiver to the console device 40. A method of transmitting the detection data from the rotating frame 17 to the non-rotating part is not limited to the above-described method using optical communication, and any non-contact type transmission method may be employed. The rotating frame 17 is not limited to an annular member and may be a member such as an arm as long as it can support and rotate the X-ray tube device 11 or the like.

Although the X-ray CT apparatus 1 is, for example, a rotate/rotate-type X-ray CT apparatus (third generation CT) in which both the X-ray tube device 11 and the X-ray detector 15 are supported by the rotating frame 17 and rotate around the patient P, it is not limited thereto and may be a stationary/rotate-type X-ray CT apparatus (fourth generation CT) in which a plurality of X-ray detection elements arranged in an annular form are fixed to a stationary frame and the X-ray tube device 11 rotates around patient P.

The control device 18 receives an input signal from an input interface (not shown) such as an operation switch attached to the gantry device 10 or an input interface 43 attached to the console device 40 and controls operations of the gantry device 10 and the bed device 30. The control device 18 includes, for example, processing circuitry having a processor such as a central processing unit (CPU), and a driving mechanism including a motor, an actuator, and the like, for example, which moves the gantry device 10, rotates the rotating frame 17 included in the gantry device 10, and moves the bed device 30. Although the control device 18 is provided in the gantry device 10 in the embodiment, the control device 18 may be provided in the console device 40. In the present description, the input interface is not limited to those having physical operation parts such as a mouse and a keyboard. For example, examples of the input interface may include electrical signal processing circuitry that receives an electrical signal corresponding to an input operation from external input equipment provided separately from the apparatus and outputs the electrical signal to control circuitry.

For example, the control device 18 tilts the gantry device 10, horizontally moves the housing of the gantry device 10 (hereinafter also simply referred to as "gantry device 10") in the direction (Z-axis direction) of the top plate 33 of the bed device 30, or moves the top plate 33 of the bed device 30 up and down in the Y-axis direction (which may include lateral movement in the X-axis direction and rotational movement around the Z-axis). When tilting the gantry device 10, the control device 18 tilts the rotating frame 17 around an axis parallel to the Z-axis direction on the basis of an inclination angle (tilt angle) input to an input interface (not shown) or the input interface 43. The control device 18 ascertains the tilt angle of the rotating frame 17 from an output of a sensor (not shown) or the like. The control device 18 provides the tilt angle of the rotating frame 17 to processing circuitry 50 as required.

The bed device 30 is a device on which the patient P to be scanned is placed, and which is moved, and introduced into the rotating frame 17 of the gantry device 10. The bed device 30 includes, for example, a base 31, a bed driving device 32, the top plate 33, and a support frame 34. The base 31 includes a housing that supports the support frame 34 such that the support frame 34 is movable in the vertical direction (upward-downward direction). The bed driving device 32 includes a motor and an actuator. The bed driving device 32 moves the top plate 33 on which the patient P is placed in the vertical direction (Y-axis direction). The bed driving device 32 may laterally move the top plate 33 on which the patient P is placed in the horizontal direction (X-axis direction) or rotate it around the Z-axis. The bed driving device 32 may move the top plate 33 on which the patient P is placed in the longitudinal direction (Z-axis direction) of the top plate 33 along the support frame 34. However, the X-ray CT apparatus 1 is a movable gantry type X-ray CT apparatus. For this reason, the amount of movement of the top plate 33 by the bed driving device 32 in the longitudinal direction is an amount of movement for introducing, into the rotating frame 17, a part of the patient P which has not been introduced into the rotating frame 17 even when the control device 18 has moved the gantry device 10 in the horizontal direction to the maximum, that is, for compensating for the amount of horizontal movement of the gantry device 10. When the gantry device 10 is movable in the Z-axis direction, the bed driving device 32 may move the gantry device 10 such that the rotating frame 17 comes around the patient P. The bed driving device 32 may be configured to move both the gantry device 10 and the top plate 33. The top plate 33 is a plate-like member on which the patient P is placed. The X-ray CT apparatus 1 may be of a type in which the patient P is scanned while standing or sitting. In this case, the X-ray CT apparatus 1 has a subject supporting mechanism in place of the bed device 30, and the gantry device 10 rotates the rotating frame 17 in an axial direction perpendicular to the floor surface.

The console device 40 includes, for example, a memory 41, a display 42, the input interface 43, network connection circuitry 44, and the processing circuitry 50. In the present embodiment, the console device 40 is described as being separate from the gantry device 10, but the gantry device 10 may include some or all of the components of the console device 40.

The memory 41 is realized by, for example, a read only memory (ROM), a random access memory (RAM), a semiconductor memory device such as a flash memory, a hard disk drive (HDD), an optical disc, or the like. The memory 41 stores, for example, data such as detection data output from the DAS 16, projection data generated on the basis of the detection data, reconstructed images, and CT images. These types of data may be stored in an external memory with which the X-ray CT apparatus 1 can communicate, instead of the memory 41 (or in addition to the memory 41). The external memory is controlled by, for example, a cloud server that manages the external memory and receives a read/write request. The external memory may be realized by a system called picture archiving and communication systems (PACS), for example. The PACS is a medical image management system that systematically stores images captured by various image diagnostic apparatuses.

The display 42 displays various types of information. For example, the display 42 displays images such as reconstructed images and CT images generated by the processing circuitry 50, and graphical user interface (GUI) images for receiving various operations by an operator (a doctor, an engineer, or the like) of the X-ray CT apparatus 1. The display 42 is, for example, a liquid crystal display (LCD), a cathode ray tube (CRT) display, an organic electroluminescence (EL) display, or the like. The display 42 may be provided on the gantry device 10. The display 42 may be of a desktop type, or may be a display device (for example, a tablet terminal) capable of wirelessly communicating with the main body of the console device 40.

The input interface 43 receives various input operations from the operator of the X-ray CT apparatus 1 and outputs electrical signals indicating the content of the received input operations to the processing circuitry 50. For example, the input interface 43 receives input operations such as collection states at the time of collecting detection data, generation states at the time of generating projection data, reconstruction states at the time of reconstructing reconstructed images, and image processing states at the time of generating post-processed images from reconstructed images. The input interface 43 is realized by, for example, a mouse, a keyboard, a touch panel, a trackball, a switch, a button, a joystick, a camera, an infrared sensor, a microphone, or the like. The input interface 43 may be provided in the gantry device 10 as an operation switch or the like to receive some input operations (in particular, to horizontally move the housing of the gantry device 10). The input interface 43 may be realized by a display device (for example, a tablet terminal) capable of wirelessly communicating with the main body of the console device 40. In the present description, the input interface 43 is not limited to those having physical operation parts such as a mouse and a keyboard. For example, examples of the input interface include electrical signal processing circuitry that receives an electrical signal corresponding to an input operation from an external input device provided separately from the apparatus and outputs the electrical signal to the control circuitry.

The network connection circuitry 44 includes, for example, a network card having a printed circuit board, a wireless communication module, or the like. The network connection circuitry 44 implements an information communication protocol according to the form of a network to be connected. Networks include, for example, a local area networks (LAN), a wide area network (WAN), the Internet, a cellular network, a dedicated line, and the like. The network connection circuitry 44 realizes connection between the console device 40 and an external memory realized by, for example, the above-described PACS.

The processing circuitry 50 controls the overall operation of the X-ray CT apparatus 1. The processing circuitry 50 executes, for example, a system control function 51, a preprocessing function 52, a reconstruction processing function 53, an image processing function 54, a display control function 55, and the like. The processing circuitry 50 realizes these functions by a hardware processor executing a program (software) stored in the memory 41, for example.

The hardware processor is, for example, circuitry such as a CPU, a graphics processing unit (GPU), an application specific integrated circuit (ASIC), or a programmable logic device (e.g., a simple programmable logic device (SPLD), a complex programmable logic device (CPLD), or a field programmable gate array (FPGA)). Instead of storing the program in the memory 41, the program may be directly embedded in the circuitry of the hardware processor. In this case, the hardware processor realizes the functions by reading and executing the program embedded in the circuitry. The hardware processor is not limited to being configured as a single circuit and may be configured as one hardware processor by combining a plurality of independent circuits to realize each function. A plurality of components may be integrated into one hardware processor to realize each function. Each function may be realized by incorporating a plurality of components into one dedicated LSI. Here, the program (software) may be stored in advance in a storage device (a storage device having a non-transitory storage medium) that constitutes a storage device such as a ROM, a RAM, a semiconductor memory element such as a flash memory, or a hard disk drive, or may be stored in a detachable storage medium (non-transitory storage medium) such as a DVD or a CD-ROM and installed in a storage device included in the console device 40 when the storage medium is set in a drive device included in the console device 40. The program (software) may be downloaded in advance from another computer device via a network connected by the network connection circuitry 44 and installed in the storage device included in the console device 40. The program (software) installed in the storage device included in the console device 40 may be forwarded to processing circuitry included in the control device 18 and executed.

Components included in the console device 40 or the processing circuitry 50 may be distributed and realized by a plurality of pieces of hardware. The processing circuitry 50 may be realized by a processing device capable of communicating with the console device 40 instead of being a component included in the console device 40. The processing device is, for example, a workstation connected to one X-ray CT apparatus, or a device (e.g., a cloud server) connected to a plurality of X-ray CT apparatuses and collectively executing processing equivalent to that of the processing circuitry 50, which will be described below. That is, the configuration of the present embodiment may also be realized as an X-ray CT examination system (medical diagnostic system) in which an X-ray CT apparatus and other processing apparatuses are connected via a network.

The system control function 51 controls various functions of the processing circuitry 50 on the basis of input operations received by the input interface 43, for example. For example, the system control function 51 controls the X-ray high voltage device 14, the DAS 16, the control device 18, and the bed driving device 32 to perform detection data collection processing and the like in the gantry device 10.

The preprocessing function 52 performs preprocessing such as logarithmic conversion processing, offset correction processing, inter-channel sensitivity correction processing, and beam hardening correction on detection data output from the DAS 16 to generate projection data and causes the memory 41 to store the generated projection data.

The reconstruction processing function 53 performs predetermined reconstruction processing according to a filter correction back projection method, an iterative approximate reconstruction method, or the like on projection data generated by the preprocessing function 52 to generate a reconstructed image and causes the memory 41 to store the generated reconstructed image.

The image processing function 54 converts a reconstructed image into a three-dimensional image (CT image) or a cross-sectional image of an arbitrary cross section by a known method on the basis of an input operation received by the input interface 43. Conversion to the three-dimensional image may be performed by the preprocessing function 52. The cross-sectional image is, for example, a sagittal image, a coronal image, or an axial image. The sagittal image is an image of a cross section that divides the patient P into two on the left and right in the forward-backward direction, in other words, a cross section (a Y-Z cross section in two axial directions of the Y axis and the Z axis shown in FIG. 1) viewed from the side of the patient P. The coronal image is an image of a cross section (frontal cross section) that divides the patient P into two, the front side (chest side) and the rear side (back side), in the left-right direction, in other words, a cross section (an X-Z cross section in two axial directions of the X axis and the Z axis shown in FIG. 1) viewed from directly in front or behind the patient P. The axial image is an image of a cross section (axial cross section) that divides the patient P into two, an upper side (head side) and a lower side (foot side), in the left-right direction, in other words, a cross section (an X-Y cross section in two axial directions of the X axis and the Y axis shown in FIG. 1) viewed at the time of looking down the patient P from the head side or looking up the patient P from the foot side.

Furthermore, the image processing function 54 determines whether or not an image captured this time by the X-ray CT apparatus 1 is suitable for examination and diagnosis of the patient P performed by a CT examination operator (a doctor, an engineer, or the like). For example, at the time of diagnosing pneumonia by imaging the lung field of the patient P with the X-ray CT apparatus 1, the image processing function 54 determines whether or not a captured image (more specifically, a converted CT image or cross-sectional image) is an image captured when the respiration of the patient P is in a maximum inspiratory state suitable for diagnosis. The image processing function 54 corrects the CT image or cross-sectional image captured this time on the basis of a determination result, or notifies the CT examination operator whether or not the CT image or cross-sectional image captured this time is suitable for diagnosis. Details of this function in the image processing function 54 will be described later. The image processing function 54 is an example of a "medical image processing apparatus."

The display control function 55 controls a display mode of the display 42. For example, the display control function 55 controls the display 42 to display a reconstructed image generated by the processing circuitry 50, a GUI image for receiving various operations by the operator of the X-ray CT apparatus 1, and the like. At the time of notifying the CT examination operator of the result determined by the image processing function 54, the display control function 55 may cause the display 42 to display a notification image representing information to be notified of, or control a notification function executed by, for example, a notification device such as a lamp or an LED which is not shown.

Figure 2:
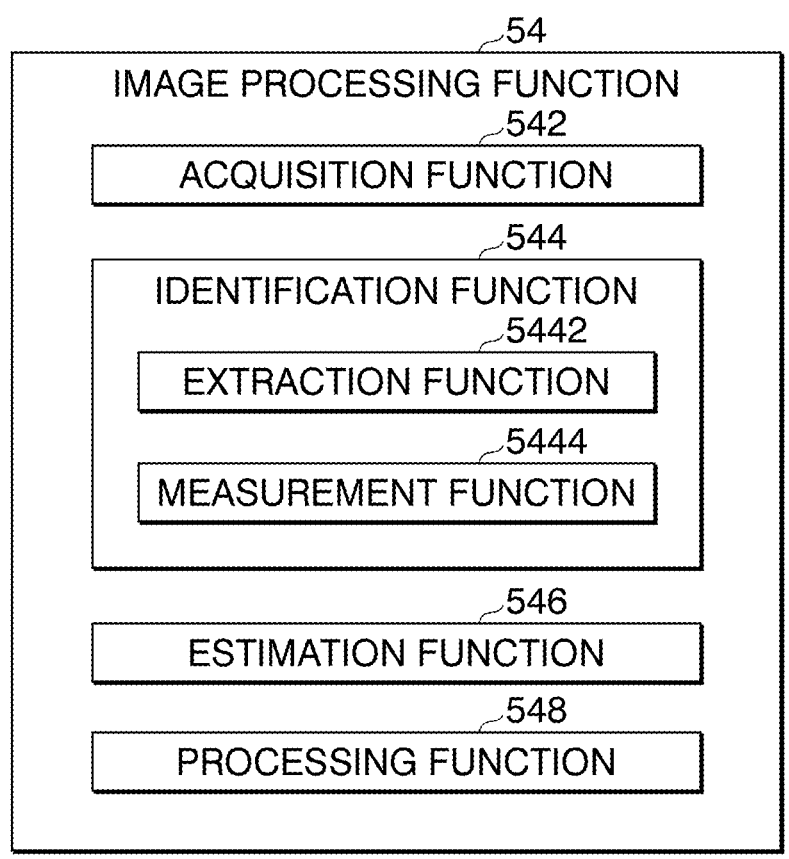
FIG. 2 is a diagram showing an example of a functional configuration of the medical image processing apparatus according to the embodiment.

Next, the configuration and operation for realizing the image processing function 54 will be described. FIG. 2 is a diagram showing an example of the functional configuration of the medical image processing apparatus according to the embodiment. The image processing function 54 includes, for example, an acquisition function 542, an identification function 544, an estimation function 546, and a processing function 548. The identification function 544 includes, for example, an extraction function 5442 and a measurement function 5444. FIG. 2 shows an example of a configuration in which the image processing function 54 executes a function of determining whether or not an image captured this time is suitable for CT examination. In the following description, it is assumed that whether or not an image of the lung field of the patient P captured by the X-ray CT apparatus 1 is suitable for diagnosing pneumonia is determined. In addition, it is assumed that an image suitable for diagnosing pneumonia is an image captured when the respiration of the patient P is in the maximum inspiratory state.

The acquisition function 542 acquires a CT image or cross-sectional image of the patient P converted by the image processing function 54. The acquisition function 542 may convert the acquired CT image into a cross-sectional image suitable for executing functions in the identification function 544 and estimation function 546. The acquisition function 542 may acquire a reconstructed image of the patient P generated by the reconstruction processing function 53 and stored in the memory 41 and convert it into a CT image or cross-sectional image of the patient P suitable for executing the functions in the identification function 544 and the estimation function 546.

The identification function 544 identifies an anatomical region constituting the thorax of the patient P captured in the CT image or cross-sectional image (hereinafter referred to as a "medical image" when the CT image and the cross-sectional image are not distinguished) acquired by the acquisition function 542. The anatomical region constituting the thorax is a region having a geometric shape or a relative positional relationship varying depending on whether the respiration of the patient P is in an expiratory state or an inspiratory state among the structures constituting the thorax. The identification function 544 obtains indexes necessary to execute the function in the estimation function 546 on the basis of the identified anatomical region constituting the thorax.

The extraction function 5442 extracts the structures constituting the thorax of the patient P from the medical image. The structures constituting the thorax extracted by the extraction function 5442 are, for example, the spine (thoracic vertebrae), ribs, sternum, the lower side of the lung field (diaphragm), intercostal muscles, and the like of the patient P. Any structure extraction method may be used in the extraction function 5442. The extraction function 5442 may extract an area corresponding to the bones and muscles of the patient P by, for example, a threshold method, corresponding to an anatomical model, an area expansion method based on an anatomical landmark, or the like. The extraction function 5442 extracts extraction information representing the positions and shapes of the structures, for example, on the basis of the extracted structures as shown below.

(Extraction information α): Extraction information on bones: feature points on the surface of a bone structure and core lines of the bone structure.

(Extraction information β): Extraction information on the diaphragm: an approximate curved surface of the diaphragm, left-right and forward-backward curvatures of the approximate curved surface, and the position of the uppermost edge of the approximate curved surface.

(Extraction information γ): Extraction information on intercostal muscles: the thickness of the intercostal muscles and the surface shape of the intercostal muscles in the body axis direction of the patient P.

The measurement function 5444 measures index values representing anatomically characteristic indexes related to respiration of the patient P on the basis of the extraction information on the structures constituting the thorax of the patient P extracted by the extraction function 5442. The anatomically characteristic indexes related to the respiration are indexes related to a mechanism of contraction and expansion of the lung field that changes with respiration. For example, in abdominal respiration, the size of the thorax changes as the diaphragm moves up and down, and the lung field contracts and expands. For example, in thoracic respiration, contraction of the intercostal muscles changes the size of the thorax, causing the lung field to contract and expand. At this time, the size of the thorax during respiration is represented as changes in vertical movement and lateral stretch of the ribs. In one cycle of respiration, the first to third ribs move little, but the seventh rib and subsequent ribs move more.

Furthermore, in one cycle of respiration, the diaphragm relaxes in an expiratory state and is largely pulled in the upward (head) direction. By using such a mechanism in which the shapes and positional relationships of the structures of the thorax change according to a respiratory state, the measurement function 5444 determines, for example, characteristic indexes during breathing and obtains index values representing the indexes as shown below.

(Index a): Index regarding an angle formed by ribs.
(Index b): Index regarding the distance between ribs.
(Index c): Index regarding the angle formed by the sternum.
(Index d): Index regarding the distance between the sternum and ribs.
(Index e): Index regarding the distance between the position of the upper edge of the diaphragm and the sternum.
(Index f): Index regarding the curvature of the diaphragm.
(Index g): Index regarding the thickness of intercostal muscles.
(Index h): Index regarding the uneven shape of intercostal muscles.

The estimation function 546 estimates, for example, a respiratory state of the patient P when a medical image is captured on the basis of index values representing indexes obtained by the identification function 544. The respiratory state represents the respiration phase of the patient P and whether the respiration of the patient P is in an expiratory state or an inspiratory state. The estimation function 546 may determine, for example, a respiratory state representing whether the respiration of the patient P is in an expiratory state or an inspiratory state when the medical image is captured on the basis of the estimated respiration phase. In this case, the estimation function 546 determines that the patient P is in the inspiratory state when the respiration of the patient P is in the maximum inspiratory state when the medical image has been captured, for example.

The processing function 548 determines whether or not the medical image is an image suitable for examination or diagnosis of the patient P (for example, an image captured at the time of the maximum inspiratory state) on the basis of the respiratory state estimated by the estimation function 546, and performs processing according to the determination result. In processing according to the determination result, the processing function 548, for example, performs processing of correcting pixel values (CT values) of the pixels (voxels) of the medical image to values equivalent to values at the time of maximum inspiratory state or performs processing of notifying the CT examination operator whether or not the image has been captured at the time of the maximum inspiratory state.

Next, an example of processing executed in each function included in the image processing function 54 will be described. First, an example of processing for extracting extraction information by the extraction function 5442 will be described.

[(Extraction Information α): Extraction Information on Bones]

Figure 3:
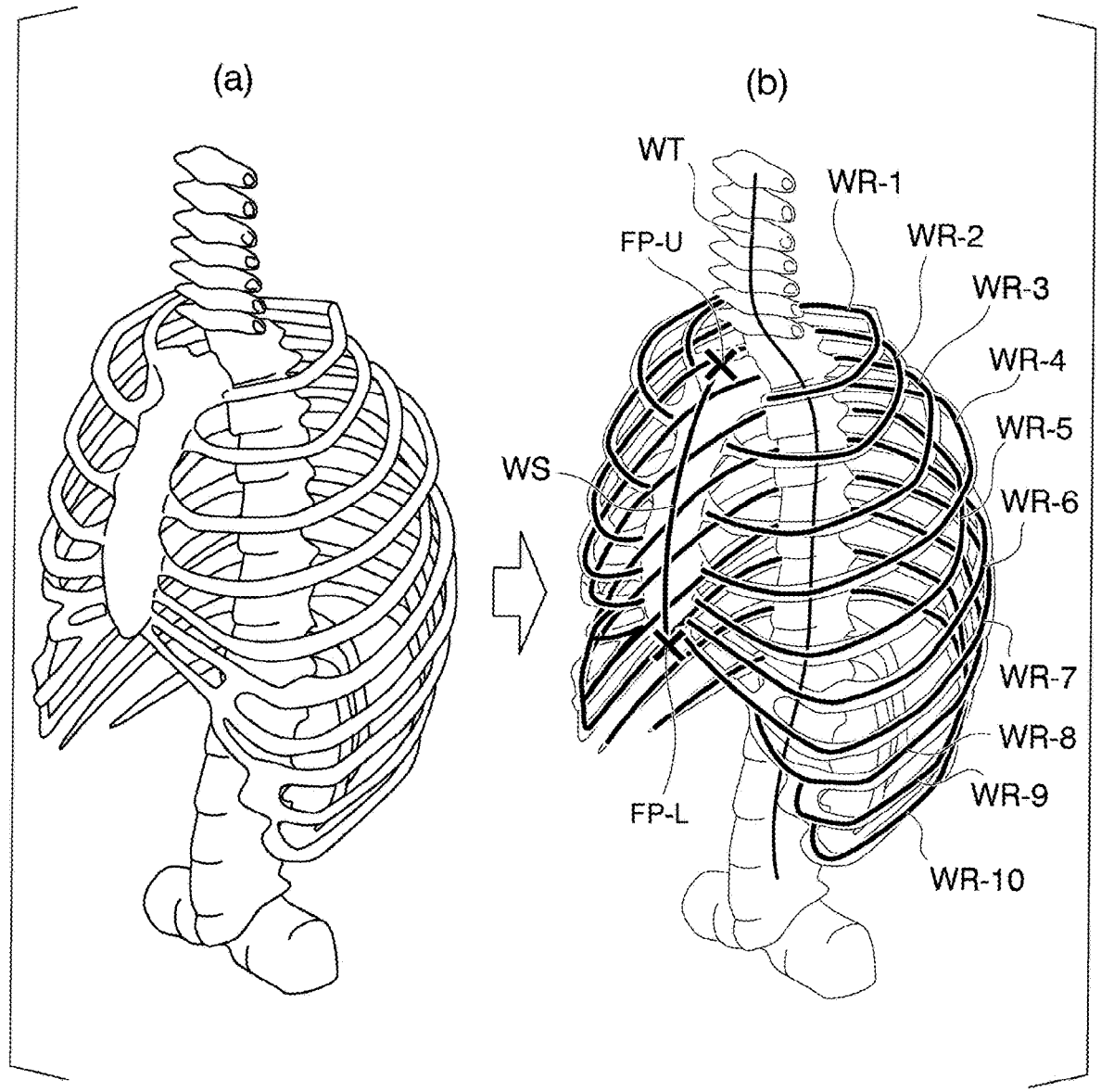
FIG. 3 is a diagram schematically showing an example of extracting extraction information on bones by an extraction function included in the medical image processing apparatus according to the embodiment.

FIG. 3 is a diagram schematically showing an example of extracting extraction information on bones by the extraction function 5442 of the medical image processing apparatus (image processing function 54) according to an embodiment. FIG. 3(*a*) shows an example of a medical image of the patient P captured by the X-ray CT apparatus 1, and FIG. 3(*b*) shows an example of information on bones of the patient P extracted by the extraction function 5442.

The extraction function 5442 extracts bone structures such as the ribs, the spine (thoracic vertebrae), and the sternum which constitute the thorax from a medical image shown in FIG. 3(*a*) and extracts extraction information such as feature points on the surfaces of the bones and core lines connecting center portions of the bones from the extracted bone structures. FIG. 3(*b*) shows a case in which the extraction function 5442 extracts a thoracic vertebra core line WT connecting the extracted center portions of the thoracic vertebrae as extraction information. FIG. 3(*b*) shows a case in which the extraction function 5442 extracts rib core lines WR connecting the extracted center portions of the respective ribs as extraction information. The extraction function 5442 distinguishes corresponding ribs, for example, by the distances (lengths) of the extracted rib core lines WR from the thoracic vertebra core line WT. The numbers following "- (hyphen)" after the sign of the rib core lines WR shown in FIG. 3(*b*) represent the numbers of the rib. For example, the rib core line WR-1 is a core line of the first rib, and the rib core line WR-7 is a core line of the seventh rib. FIG. 3(*b*) shows a case in which the extraction function 5442 extracts feature points FP of a feature point FP-U on the upper side (head side) of the extracted sternum and a feature point FP-L on the lower side (foot side) of the sternum as extraction information and extracts a sternum core line WS connecting the feature points FP-U and FP-L as extraction information.

[(Extraction Information β): Extraction Information on Diaphragm]

Figure 4:
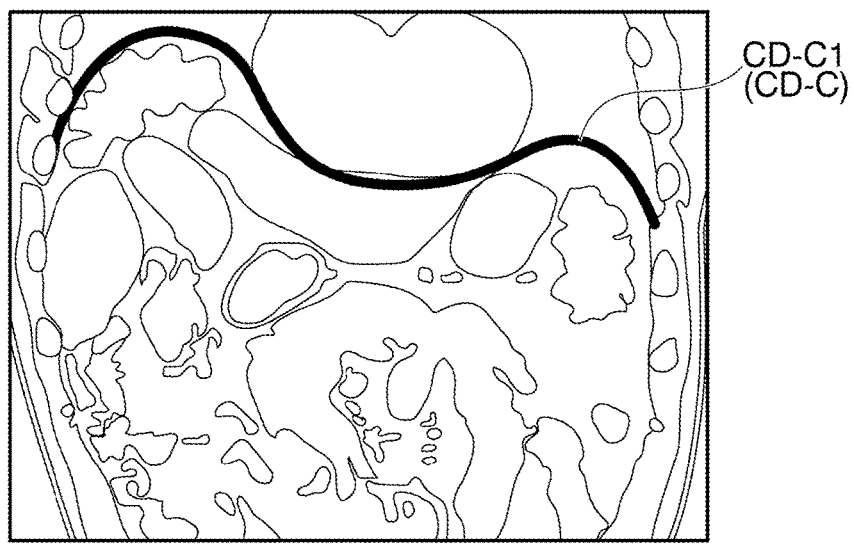
FIG. 4 is a diagram schematically showing an example of extracting extraction information on a diaphragm by the extraction function included in the medical image processing apparatus according to the embodiment.
Figure 4:
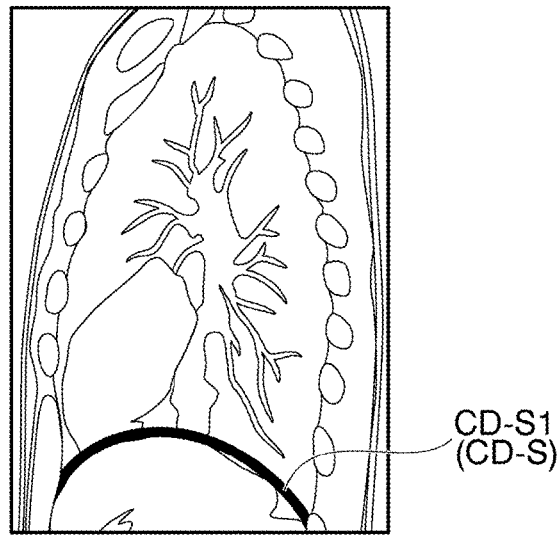
Figure 4:
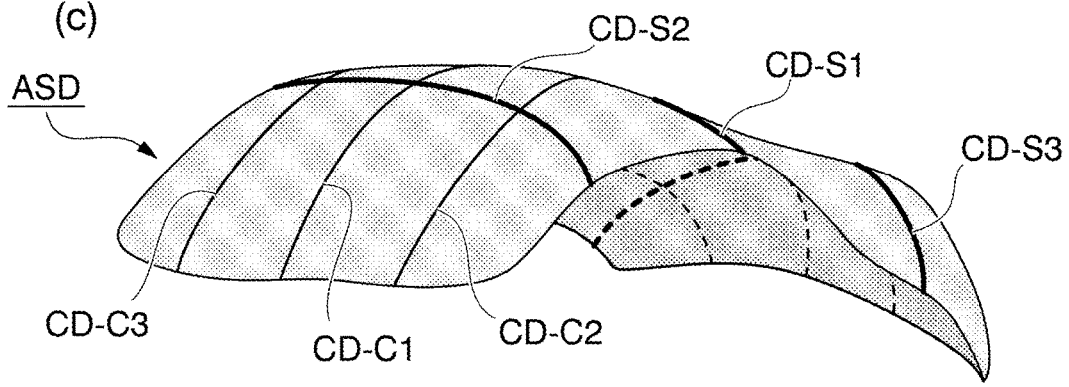

FIG. 4 is a diagram schematically showing an example of extracting extraction information on the diaphragm by the extraction function 5442 of the medical image processing apparatus (image processing function 54) according to the embodiment. FIG. 4(*a*) shows an example of a medical image (coronal image) of the patient P captured by the X-ray CT apparatus 1, FIG. 4(*b*) shows an example of a medical image (sagittal image) of the patient P captured by the X-ray CT apparatus 1, and FIG. 4(*c*) shows an example of an approximate curved surface of the diaphragm of the patient P.

The extraction function 5442 extracts a curve of a cross section of the diaphragm (hereinafter referred to as "diaphragm cross-sectional curve") CD from each of the coronal image and the sagittal image, and extracts an approximate curved surface obtained by approximating the shape of the diaphragm from the extracted diaphragm cross-sectional curves CD as extraction information. At this time, the extraction function 5442 may extract the diaphragm cross-sectional curve CD from each of a plurality of coronal images and sagittal images to extract the approximate curved surface of the diaphragm. The plurality of coronal images and sagittal images can be obtained by changing a position of conversion to a cross-sectional image in the sagittal direction (Y-axis direction) or the coronal direction (X-axis direction). For example, the extraction function 5442 obtains three coronal images at positions shifted from the center of the thickness of the body of the patient P (that is, the position of ½ in the Y-axis direction) by ¼ of the thickness in the forward-backward direction, that is, positions of ¼, ½, and ¾ from the front side (chest side) with respect to the thickness of the body of the patient P. For example, the extraction function 5442 obtains three sagittal images at positions shifted from the center of the width of the body of the patient P (that is, the position of ½ in the X-axis direction) by ¼ of the width in the left-right direction, that is, positions of ¼, ½, and ¾ from the left side (or the right side) with respect to the width of the body of the patient P. Each of the three coronal images and the three sagittal images may be converted by the acquisition function 542 from an acquired medical image, or may be converted when the extraction function 5442 extracts extraction information. The extraction function 5442 extracts three diaphragm cross-sectional curves CD-C in the X-axis direction from the obtained three coronal images and extracts three diaphragm cross-sectional curves CD-S in the Y-axis direction orthogonal to the diaphragm cross-sectional curves CD-C from the obtained three sagittal images. Thereafter, the extraction function 5442 extracts an approximate curved surface of the diaphragm by obtaining an approximate curved surface that approximates the surface of the diaphragm on the basis of the extracted diaphragm cross-sectional curves CD-C and diaphragm cross-sectional curves CD-S. FIG. 4(*a*) shows a case in which a diaphragm cross-sectional curve CD-C (for example, a diaphragm cross-sectional curve CD-C1) is extracted as extraction information from a coronal image. FIG. 4(*b*) shows a case in which a diaphragm cross-sectional curve CD-S (for example, a diaphragm cross-sectional curve CD-S1) is extracted as extraction information from a sagittal image. FIG. 4(*c*) shows a case in which a curved surface ASD of the diaphragm (hereinafter referred to as a "diaphragm approximate curved surface") approximated on the basis of three diaphragm cross-sectional curves CD-C (diaphragm cross-sectional curves CD-C1 to C3) and three diaphragm cross-sectional curves CD-S (diaphragm cross-sectional curves CD-S1 to S3) is extracted as extraction information.

The extraction function 5442 may extract the curvatures of the diaphragm in the left-right direction (X-axis direction) and the forward-backward direction (Y-axis direction) and the position of the uppermost edge of the diaphragm as extraction information on the basis of the extracted diaphragm cross-sectional curves CD and the diaphragm approximate curved surface ASD. The position of the uppermost edge is the position closest to the head side (upper side) of the patient P, in other words, the position where the diaphragm is most distended.

The extraction function 5442 may extract an approximate curved surface equivalent to the diaphragm approximate curved surface ASD using, for example, the position of the boundary between the lung field and the liver of the patient P instead of the diaphragm when the diaphragm of the patient P captured in the coronal images or the sagittal images is unclear. In this case, extraction processing and processing of obtaining an approximate curved surface in the extraction function 5442 may be equivalent to the above-described processing for extracting the diaphragm approximate curved surface ASD.

[(Extraction Information γ): Extraction Information on Intercostal Muscles]

Figure 5:
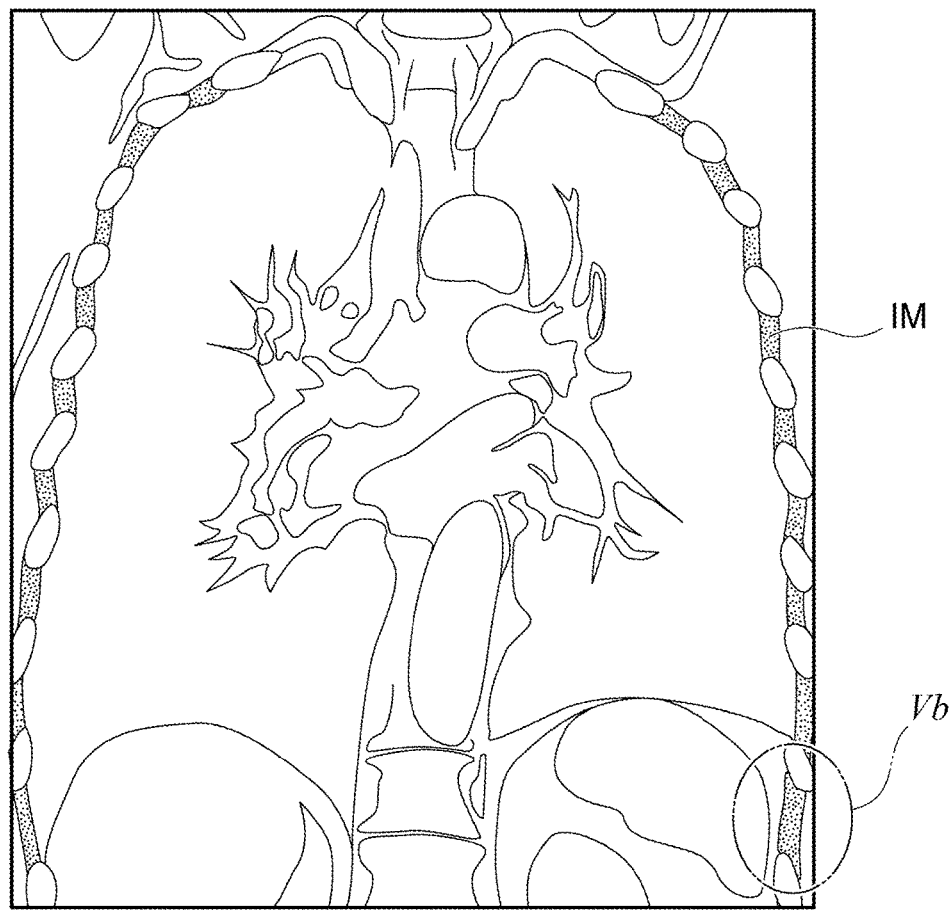
FIG. 5 is a diagram schematically showing an example of extracting extraction information on intercostal muscles by the extraction function included in the medical image processing apparatus according to the embodiment.
Figure 5:
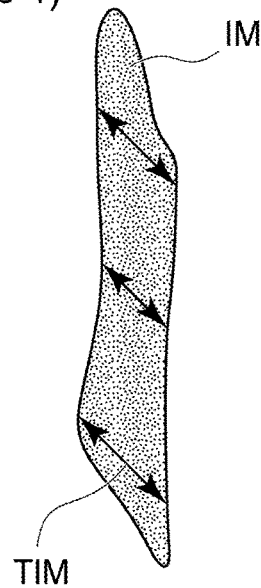
Figure 5:
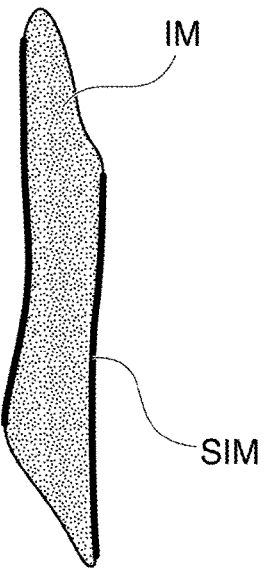

FIG. 5 is a diagram schematically showing an example of extracting extraction information on intercostal muscles using the extraction function 5442 included in the medical image processing apparatus (image processing function 54) according to the embodiment. FIG. 5(*a*) shows an example of a medical image (coronal image) of the patient P captured by the X-ray CT apparatus 1, and FIG. 5(*b*) shows an example of the shape of the intercostal muscles IM changing according to the respiration of the patient P.

The extraction function 5442 extracts the intercostal muscles IM between the ribs from the coronal image and extracts thicknesses of the extracted intercostal muscles IM and the surface shape of the intercostal muscles IM in the body axis direction as extraction information. The thicknesses of the intercostal muscles IM include the thickness at the middle position of the intercostal muscles IM (i.e., a position corresponding to half the distance between two vertically adjacent ribs) and the thickness at positions of the upper side and the lower side (i.e., positions near the two vertically adjacent ribs). The surface shape of the intercostal muscles IM in the body axis direction is unevenness at the end on the side orthogonal to the two vertically adjacent ribs. FIG. 5(*a*) shows an example of intercostal muscles IM present between ribs in the coronal image. FIG. 5(*b*-1) shows a case in which thicknesses (hereinafter referred to as "intercostal muscle thicknesses") TIM in intercostal muscles IM present between the ninth rib and the tenth rib (intercostal muscles IM present in an area Vb surrounded by a two-dot chain line in FIG. 5(*a*)) are extracted as extraction information, and FIG. 5(*b*-2) shows a case in which a surface shape (hereinafter referred to as an "intercostal muscle surface shape") SIM in the same intercostal muscles IM is extracted as extraction information.

By performing processing as described above, the extraction function 5442 extracts each piece of extraction information on the basis of the structures constituting the thorax of the patient P extracted from the medical image.

Next, an example of processing of the measurement function 5444 for measuring indexes related to respiration of the patient P on the basis of extraction information extracted through processing performed by the extraction function 5442 will be described.

[(Index a): Index Regarding Angle Formed by Ribs]

Figure 6:
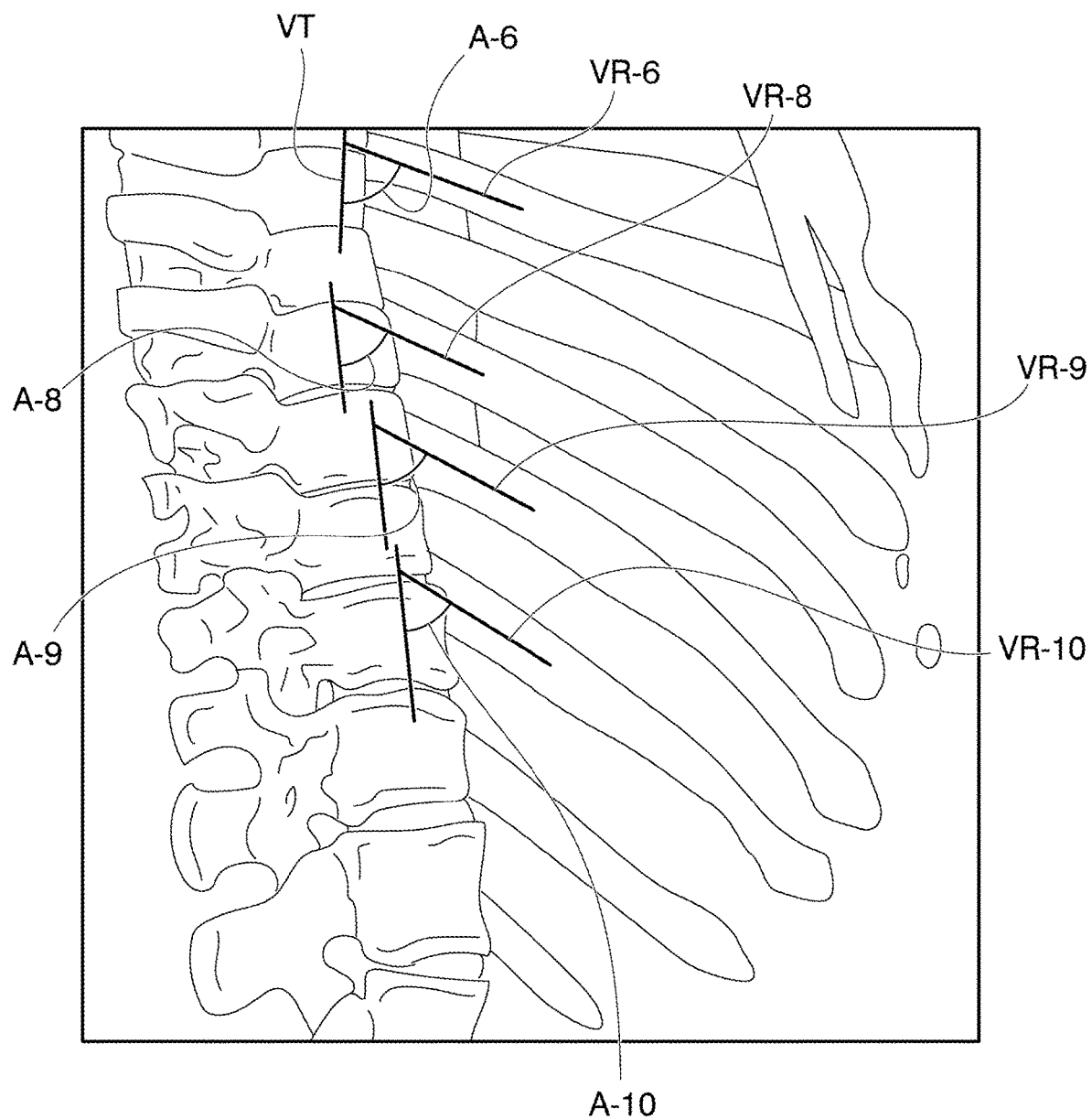
FIG. 6 is a diagram schematically showing an example of measuring indexes regarding angles formed by ribs by a measurement function included in the medical image processing apparatus according to the embodiment.

FIG. 6 is a diagram schematically showing an example of measuring an index regarding an angle formed by ribs by the measurement function 5444 included in the medical image processing apparatus (image processing function 54) according to the embodiment. FIG. 6 shows an example of measuring an angle formed by ribs in a sagittal image of the patient P captured by the X-ray CT apparatus 1.

The measurement function 5444 measures an angle formed by ribs on the basis of a thoracic vertebra core line WT and rib core lines WR extracted by the extraction function 5442. More specifically, the measurement function 5444 represents each of the thoracic vertebra core line WT and the rib core lines WR as a vector, and measures an angle at which the vector of the thoracic vertebra core line WT (hereinafter referred to as a "thoracic vertebra vector VT") and the vector of a thoracic vertebra core line WT (hereinafter referred to as a "rib vector VR") intersect as an angle A formed by ribs (hereinafter referred to as a "rib angle"). FIG. 6 shows an example of a case in which an angle at which the thoracic vertebra vector VT and a rib vector VR-6 of the sixth rib intersect in a section where the ribs are connected to the thoracic vertebrae is measured as a sixth rib angle A-6. Similarly, FIG. 6 shows an example of a case in which rib angles A of an eighth rib angle A-8, a ninth rib angle A-9, and a tenth rib angle A-10 are measured. In FIG. 6, numbers following "- (hyphen)" after the sign of the rib vector VR or rib angle A also represent the numbers of the ribs.

Figure 7:
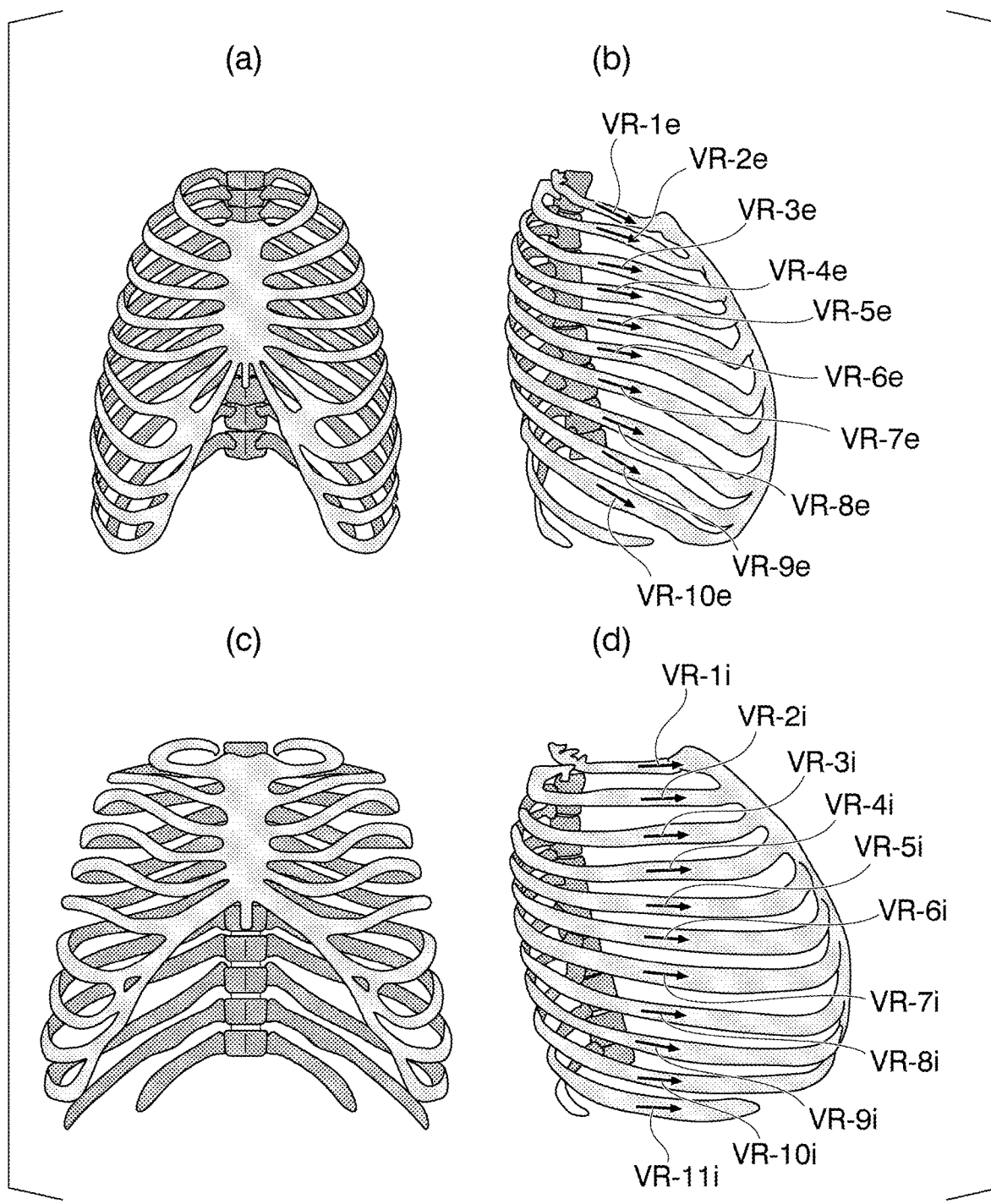
FIG. 7 is a diagram schematically showing an example of vectors of ribs for measuring indexes regarding angles formed by the ribs by the measurement function included in the medical image processing apparatus according to the embodiment.

FIG. 7 is a diagram schematically showing an example of vectors of ribs for measuring, by the measurement function 5444 included in the medical image processing apparatus (image processing function 54) according to the embodiment, indexes regarding angles formed by the ribs. For comparison, FIG. 7 shows an example of rib vectors VR when respiration of the patient P is in an expiratory state and in an inspiratory state. FIG. 7(*a*) shows an example of a coronal image when the respiration of the patient P is in the expiratory state, FIG. 7(*b*) shows an example of a sagittal image when the respiration of the patient P is in the expiratory state, FIG. 7(*c*) shows an example of a coronal image when the respiration of the patient P is the inspiratory state, and FIG. 7(*d*) shows an example of a sagittal image when the respiration of the patient P is in the inspiratory state. Furthermore, FIG. 7(*b*) and FIG. 7(*d*) show examples of rib vectors VR of the ribs. In FIGS. 7(*b*) and 7(*d*), numbers following "- (hyphen)" after the sign of the rib vector VR represent numbers of the ribs, subsequent "e"

indicates the expiratory state, and "i" indicates the inspiratory state. For example, a rib vector VR-le is a vector of the first rib when respiration is in the expiratory state, and a rib vector VR-li is a vector of the first rib when respiration is in the inspiratory state. For example, by comparing the directions of a rib vector VR-9e shown in FIG. 7(b) and a rib vector VR-9i shown in FIG. 7(d), it can be ascertained that the size of the thorax during respiration is represented as changes in the vertical movement and lateral stretch of the ribs, and movement of the seventh rib and subsequent ribs increases in one cycle of respiration, as described above.

The measurement function 5444 may perform measurement by setting a vector in the body axis (Z-axis) direction of the patient P as the thoracic vertebra vector VT and setting an angle at which the thoracic vertebra vector VT and each rib vector VR intersect as each rib angle A. In a section where the curvatures of the rib core lines WR are high, the measurement function 5444 may set the vector in the body axis direction of the patient P as the thoracic vertebra vector VT, set vectors in the tangential direction of the rib core lines WR as rib vectors VR, and measure an angle at which the thoracic vertebra vector VT and each rib vector VR intersect as each rib angle A. The measurement function 5444 may set the vector in the body axis direction of the patient P as the thoracic vertebra vector VT, set vectors obtained by projecting the rib core lines WR in the direction of the sagittal section (X-axis direction) as rib vectors VR, and measure an angle at which the thoracic vertebra vector VT and each rib vector VR intersect as each rib angle A.

[(Index b): Index Regarding Distance Between Ribs]

Figure 8:
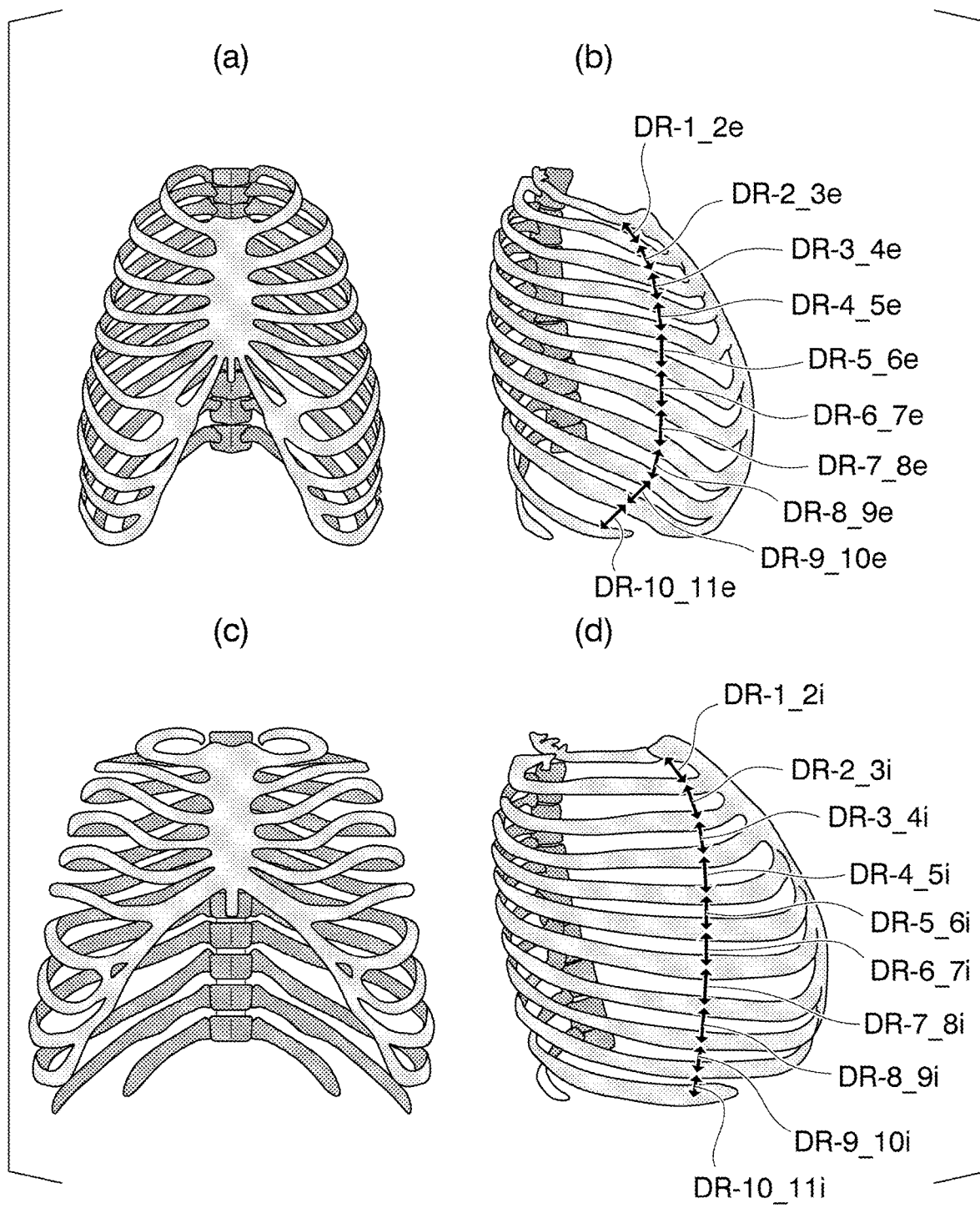
FIG. 8 is a diagram schematically showing an example of measuring indexes regarding distances between ribs by the measurement function included in the medical image processing apparatus according to the embodiment.

FIG. 8 is a diagram schematically showing an example of measuring an index regarding the distance between ribs by the measurement function 5444 included in the medical image processing apparatus (image processing function 54) according to the embodiment. For comparison, FIG. 8 shows an example of the distance between ribs (hereinafter referred to as an "inter-rib distance DR") when respiration of the patient P is in the expiratory state and in the inspiratory state. FIG. 8(a) shows an example of a coronal image when respiration of the patient P is in the expiratory state, FIG. 8(b) shows an example of a sagittal image when respiration of the patient P is in the expiratory state, FIG. 8(c) shows an example of a coronal image when respiration of the patient P is the inspiratory state, and FIG. 8(d) shows an example of a sagittal image when respiration of the patient P is in the inspiratory state.

The measurement function 5444 measures the distance between ribs on the basis of the rib core lines WR extracted by the extraction function 5442. More specifically, the measurement function 5444 measures the distance between two points of the rib core lines WR of two vertically adjacent ribs as an inter-rib distance DR. The two points at which the measurement function 5444 measures the inter-rib distance DR are points on rib core lines WR equidistant from positions at which the ribs are connected to the thoracic vertebrae. FIGS. 8(b) and 8(d) show examples of a case in which the distance between two points equidistant from the positions at which the ribs are connected to the thoracic vertebrae is measured as the inter-rib distance DR between the ribs. In FIGS. 8(b) and 8(d), numbers following "- (hyphen)" after the sign of the inter-rib distance DR indicate numbers of the two ribs for which the distance is measured having "_ (under bar)" interposed therebetween, subsequent "e" indicates the expiratory state, and "i" indicates the inspiratory state. For example, an inter-rib distance DR-1_2e is the distance between the first rib and the second rib when respiration is in the expiratory state, and an inter-rib distance DR-1_2i is the distance between the first rib and the second rib when respiration is in the inspiratory state. For example, by comparing the length of an inter-rib distance DR-8_9e shown in FIG. 8(b) with the length of an inter-rib distance DR-8_9i shown in FIG. 8(d), it can be ascertained that the size of the thorax during respiration is represented as changes in the vertical movement and lateral stretch of the ribs, and movement of the seventh rib and subsequent ribs increases in one cycle of respiration, as described above.

The measurement function 5444 may measure a plurality of distances between two points equidistant for each certain unit distance from positions at which the ribs are connected to the thoracic vertebrae (that is, distances of a plurality of different points on the same rib core line WR in the Y-axis direction) as a plurality of inter-rib distances DR. The measurement function 5444 may measure, as a plurality of inter-rib distances DR, distances between two points (that is, distances between two vertically adjacent ribs at different positions in the X-axis direction) in coronal images moved by a certain unit distance in the thickness direction (X-axis direction) of the body of the patient P. The measurement function 5444 may project a rib core line WR in the direction of the sagittal section (X-axis direction) and measure, as an inter-rib distance DR, the distance between two points (which may be a plurality of distances between two points) equidistant in the horizontal axis direction (Y-axis direction) on the projected rib core line WR or equidistant from a position at which the rib is connected to the thoracic vertebrae. The measurement function 5444 may measure, as an inter-rib distance DR, the distance between two vertically adjacent ribs at the position of the end of each rib core line WR that is not connected to the thoracic vertebrae (that is, the position of the maximum distance on the rib core line WR).

[(Index c): Index Regarding Angle Formed by Sternum]

Figure 9:
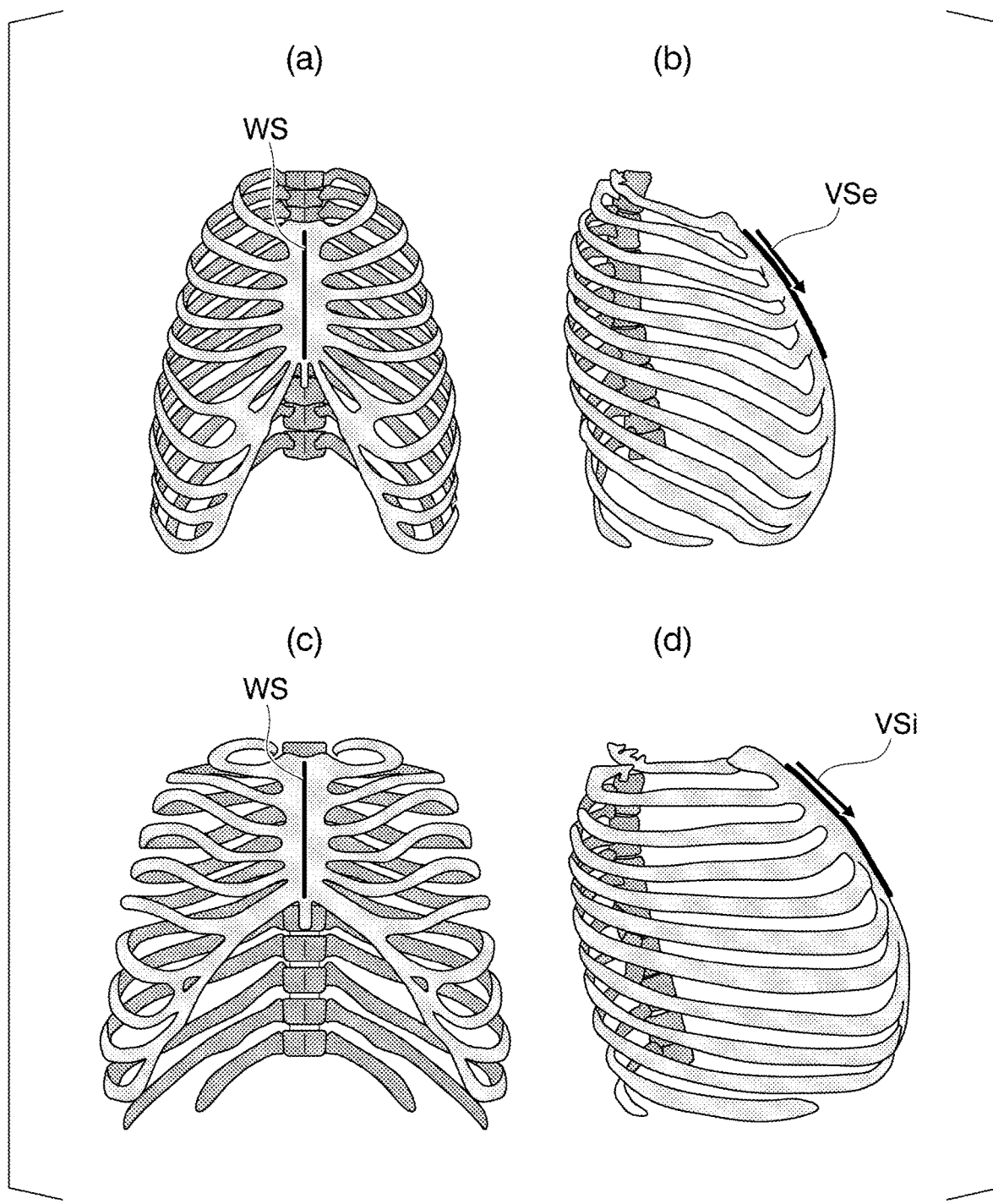
FIG. 9 is a diagram schematically showing an example of measuring an index regarding an angle formed by a sternum by the measurement function included in the medical image processing apparatus according to the embodiment.

FIG. 9 is a diagram schematically showing an example of measuring an index regarding an angle formed by the sternum by the measurement function 5444 included in the medical image processing apparatus (image processing function 54) according to the embodiment. For comparison, FIG. 9 shows examples of angles formed by the sternum when respiration of the patient P is in the expiratory state and in the inspiratory state. FIG. 9(a) shows an example of a coronal image when respiration of the patient P is in the expiratory state, FIG. 9(b) shows an example of a sagittal image when respiration of the patient P is in the expiratory state, FIG. 9(c) shows an example of a coronal image when respiration of the patient P is in the inspiratory state, and FIG. 9(d) shows an example of a sagittal image when respiration of the patient P is in the inspiratory state. In addition, FIGS. 9(a) and 9(c) show examples of a sternum core line WS.

The measurement function 5444 measures an angle formed by the sternum on the basis of the sternum core line WS extracted by the extraction function 5442. More specifically, the measurement function 5444 represents the sternum core line WS as a vector, and measures an angle at which the vector of the sternum core line WS (hereinafter referred to as a "sternum vector VS") and the vector in the body axis (Z-axis) direction of the patient P intersect as an angle formed by the sternum on the upper side of the sternum (head side) (that is, on the side of the feature point FP-U). FIGS. 9(b) and 9(d) show examples of the sternum vector VS having a feature point FP-U on the sternum as a starting point. In FIGS. 9(b) and 9(d), "e" after the sign of the sternum vector VS indicates an expiratory state and "i" indicates an inspiratory state. For example, by comparing angles of a sternum vector VSe shown in FIG. 9(*b*) and a sternum vector VSi shown in FIG. 9(*d*), it can be ascertained that the size of the thorax during respiration is represented as changes in the vertical movement and lateral stretch of the ribs, as described above.

[(Index d): Index Regarding Distance Between Sternum and Rib]

The measurement function 5444 determines, as the distance between the sternum and a rib, the distance between a point at which perpendicular lines drawn down from points closest to the sternum on the rib core lines WR extracted by the extraction function 5442 to the thoracic vertebra core line WT intersect and a point on a rib core line WR furthest from that point in the sagittal direction (Y-axis direction).

[(Index e): Index Regarding Distance Between Position of Upper Edge of Diaphragm and Sternum]

The measurement function 5444 measures, as the distance between the position of the upper edge of the diaphragm and the sternum, the distance between the position of the uppermost edge of the diaphragm (that is, the position where the diaphragm is most distended) represented by the diaphragm approximate curved surface ASD (which may be the diaphragm cross-sectional curve CD) extracted by the extraction function 5442, and the sternum (for example, the distance between the end of the head side (upper side) of the patient P on the thoracic vertebra core line WT).

[(Index f): Index Regarding Curvature of Diaphragm]

The measurement function 5444 measures a curvature and a curvature radius of the diaphragm represented by the diaphragm approximate curved surface ASD extracted by the extraction function 5442 as a curvature of the diaphragm. The measurement function 5444 may measure, as a curvature of the diaphragm, the curvature or the curvature radius of the diaphragm cross-sectional curve CD, more specifically, each diaphragm cross-sectional curve CD-C or each diaphragm cross-sectional curve CD-S (refer to FIG. 4). When the extraction function 5442 has extracted the curvatures of the diaphragm in the left-right direction (X-axis direction) and the forward-backward direction (Y-axis direction) as extraction information, the measurement function 5444 may measure the curvature of the diaphragm using the extraction information extracted by the extraction function 5442. The extraction function 5442 may measure indexes relating to the uneven shape of the diaphragm approximate curved surface ASD extracted by the extraction function 5442. The indexes related to the uneven shape indicate, for example, whether or not the diaphragm is distended at two points on the left and right (in other words, the center portion is depressed) in the left-right direction (X-axis direction) of the diaphragm. When the diaphragm of the patient P captured in coronal images or sagittal images is unclear, and the extraction function 5442 extracts the position of the boundary between the lung field and the liver of the patient P, for example, as an approximate curved surface equivalent to the diaphragm approximate curved surface ASD, the measurement function 5444 may measure the curvature and curvature radius of this approximate curved surface as the curvature of the diaphragm.

[(Index g): Index Regarding Thickness of Intercostal Muscles]

The measurement function 5444 measures an intercostal muscle thickness TIM of each intercostal muscle IM extracted by the extraction function 5442 as the thickness of the intercostal muscle.

[(Index h): Index Regarding Uneven Shape of Intercostal Muscles]

The measurement function 5444 measures an intercostal muscle surface shape SIM of each intercostal muscle IM extracted by the extraction function 5442 as an uneven shape of the intercostal muscle. The measurement function 5444 may obtain a degree of unevenness of the intercostal muscles IM in the body axis direction on the basis of the intercostal muscle surface shape SIM (which may include the intercostal muscle thickness TIM), and measure the obtained degree of unevenness as an uneven shape of the intercostal muscles.

Next, an example of processing for estimating a respiratory state of the patient P by the estimation function 546 on the basis of indexes (index values) measured through processing performed by the identification function 544 will be described. First, an example of processing when the estimation function 546 estimates whether or not respiration of the patient P has been in the maximum inspiratory state when a medical image has been captured will be described.

As described above, the size of the thorax during respiration is represented as changes in the vertical movement and lateral stretch of the ribs, and movement of the seventh rib and subsequent ribs increases in one cycle of respiration. Furthermore, in one cycle of respiration, the diaphragm relaxes in the expiratory state and is largely pulled in the upward (head) direction. That is, the curvature of the diaphragm in the sagittal direction (Y-axis direction) increases on the front side (chest side) in the expiratory state. The estimation function 546 estimates whether or not respiration of the patient P when a medical image has been captured has been in the inspiratory state by comparing index values measured by the identification function 544 with a mechanism that changes the shape of the thorax according to respiration. Accordingly, the estimation function 546 sets the following conditions for estimating that respiration of the patient P is in the inspiratory state, and estimates index values measured by the identification function 544 on the basis of the set conditions. More specifically, the estimation function 546 determines whether or not the index values measured by the identification function 544 satisfy the set conditions. The estimation function 546 estimates that respiration of the patient P when the medical image has been captured has not been in the inspiratory state if the index values measured by the identification function 544 do not satisfy any of the set conditions.

(Condition 1): Differences between maximum angles formed by the first rib, the eighth rib, and the twelfth rib represented by indexes regarding angles formed by ribs are equal to or less than a predetermined angle threshold. For example, the difference between a maximum angle formed by the first rib and a maximum angle formed by the eighth rib is "8°" or less, and the difference between a maximum angle formed by the eighth rib and a maximum angle formed by the twelfth rib is "12°" or less.

(Condition 2): A difference between angles formed by two vertically adjacent ribs represented by indexes regarding angles formed by the ribs is equal to or less than a predetermined angle threshold (for example, 1°).

(Condition 3): The distance between the seventh rib and the eighth rib and the distance between the eleventh rib and the twelfth rib represented by indexes regarding distances between the ribs are equal to or less than a predetermined distance threshold value. For example, a maximum distance between the seventh rib and the eighth rib is 1.2 times or less the distance of a position at which each of the seventh rib and the eighth rib is connected to the thoracic vertebrae, and a maximum distance between the eleventh rib and the twelfth rib is 1.4 times or less the distance of a position at which each of the eleventh rib and the twelfth rib is connected to the thoracic vertebrae.

(Condition 4): A curvature radius of the diaphragm cross-sectional curve CD-S in the forward-backward direction (Y-axis direction) of the diaphragm, represented by indexes regarding the curvature of the diaphragm, is equal to or greater than a predetermined radius threshold value (for example, radius R=5).

(Condition 5): In the diaphragm cross-sectional curve CD-C in the left-right direction (X-axis direction) of the upper edge position of the diaphragm represented by the indexes regarding the curvature of the diaphragm, a difference in the body axis direction between a highest (distended) point and a lowest (depressed) point is equal to or less than a predetermined distance threshold value (for example, 15 mm). For example, in the example shown in FIG. 4, in the diaphragm cross-sectional curve CD-C1, a difference in the body axis direction between a portion orthogonal to the diaphragm cross-sectional curve CD-S1 and a portion orthogonal to the diaphragm cross-sectional curve CD-S2 and/or the diaphragm cross-sectional curve CD-S3 is 15 mm or less. For example, when the indexes regarding the uneven shape of the diaphragm indicate that the diaphragm is distended at two points on the left and right, the difference from the depressed center portion may be 15 mm or less.

(Condition 6): In each of the intercostal muscles IM of the seventh rib and subsequent ribs represented by indexes regarding thicknesses of intercostal muscles, the intercostal muscle thickness TIM at the center position is almost the same as the intercostal muscle thicknesses TIM at the positions of the upper side and the lower side or greater than the intercostal muscle thicknesses TIM at the positions of the upper side and the lower side. The intercostal muscles IM of the seventh rib and subsequent ribs include the intercostal muscle IM between the seventh and eighth ribs, the intercostal muscle IM between the eighth and ninth ribs, the intercostal muscle IM between the ninth and tenth ribs, the intercostal muscle IM between the tenth and eleventh ribs, the intercostal muscle IM between the eleventh and twelfth ribs.

(Condition 7): The uneven shape of each intercostal muscle IM represented by indexes regarding the uneven shapes of intercostal muscles is a curved surface (convex shape) that bulges laterally with respect to the body axis direction.

If measured index values satisfy all the conditions, the estimation function 546 estimates that a medical image captured this time is an image of the inspiratory state of the patient P suitable for CT examination by comparing each index value measured from the medical image captured this time with each set condition.

The aforementioned conditions are merely examples, and any condition may be set for estimation as long as it is possible to estimate whether or not respiration of the patient P has been in the maximum inspiratory state when a medical image has been captured on the basis of index values. That is, different conditions may be set in addition to or instead of the aforementioned conditions. For example, the threshold value for estimating whether or not each condition is satisfied may be changed on the basis of conditions related to the physique of the patient P including whether the patient P is an adult or a child, male or female, and the like. In this case, the threshold value in each condition may be input by the CT examination operator (doctor, engineer, or the like) by operating the input interface 43 or may be selected from threshold values prepared in advance. A threshold value may be selected, for example, by the CT examination operator from a combination of threshold values prepared in advance, or may be automatically selected on the basis of the physique (height, weight, sex, adult/child, etc.) of the patient P input through the input interface 43 at the time of CT examination. For automatic selection of a threshold value, for example, a threshold value depending on an input physique of the patient P may be selected from a combination of threshold values for each physique prepared in advance, or a threshold value generated by multiplying a reference threshold value by a ratio depending on the physique of the patient P may be selected.

Next, an example of processing in a case where the estimation function 546 estimates a respiration phase of the patient P on the basis of each index value measured from the medical image captured this time, that is, processing in a case where the estimation function 546 estimates which timing of a respiration period of the patient P corresponds to the medical image captured this time, will be described.

By the way, the respiration cycle of the patient P cannot be accurately estimated from one medical image. Therefore, a first configuration for estimating the respiration phase of the patient P in the medical image processing apparatus (image processing function 54) is a configuration in which index values measured in advance at each timing of at least one cycle of respiration are stored as a database, for example, in the memory 41 or an external memory with which the X-ray CT apparatus 1 can communicate, such as a PACS. In the image processing function 54 having the first configuration, the estimation function 546 estimates which timing in the respiration phase of the patient P corresponds to the medical image captured this time by comparing an index value measured by the identification function 544 from the medical image captured this time with the index values of the database stored in advance. In this case, the estimation function 546 searches for an index value in the database which has the smallest difference from the index value measured by the identification function 544, and assumes the timing corresponding to the searched index value as the timing of the respiration phase of the patient P which corresponds to the medical image captured this time.

A second configuration for estimating the respiration phase of the patient P in the medical image processing apparatus (image processing function 54) is, for example, a configuration using a function of searching for similar respiration phases by artificial intelligence (AI). In the image processing function 54 having the second configuration, when an index value is input, a model trained to output a result of determination of which timing in one cycle of respiration corresponds to the input index value is generated. The trained model is generated by learning the relationship between index values based on data collected when a CT examination has been previously performed on subjects (including patients different from patient P) and results of determination of which timing in one cycle of respiration corresponds to the index values, for example, using a function of AI. For example, the trained model may be a model trained to output a timing of a respiration phase corresponding to an input index value as a determination result using technology such as a convolutional neural network (CNN) or a deep neural network (DNN) when the index value is input. A CNN is a neural network in which several layers such as a convolution layer and a pooling layer are connected. A DNN is a neural network in which layers in an arbitrary form are connected in multiple layers. In this case, the trained model is generated, for example, by machine learning using a machine learning model by a computing device (not shown) and the like. A machine learning model is, for example, a model having a form such as a CNN or a DNN and having parameters temporarily set therein.

Next, an example of processing performed by the processing function 548 on the basis of the result of processing performed by the estimation function 546 will be described. First, an example of processing of notifying, by the processing function 548, the CT examination operator of a result of estimation of whether or not respiration of the patient P when a medical image has been captured has been in the maximum inspiratory state, estimated by the estimation function 546, will be described.

If the estimation function 546 estimates that respiration of the patient P when a medical image has been captured has not been in the maximum inspiratory state, the processing function 548 notifies the CT examination operator that the medical image captured this time is not suitable for diagnosis by controlling the function provided in the display control function 55. For example, the processing function 548 generates a notification message to be superimposed on the medical image in order to indicate that the image is not an image suitable for diagnosis, outputs the generated notification message, and instructs the display control function 55 to cause the display 42 to display it as a notification image. Accordingly, the display control function 55 causes the display 42 to display the notification image on which the notification message is superimposed according to the instruction from the processing function 548. For example, the processing function 548 instructs the display control function 55 to cause a notification device such as a lamp or an LED which is not shown to perform notification in order to indicate that the image is not suitable for diagnosis. Accordingly, the display control function 55 performs notification (turning on/off a lamp or an LED and changing colors) through a notification device which is not shown according to the instruction from the processing function 548. The processing function 548 may, for example, add additional information indicating that the image is not suitable for diagnosis to the medical image. Accordingly, at the time of diagnosing the patient P using the same medical image again at a different time, the X-ray CT apparatus 1 can notify the CT examination operator (including different operators) of the same result as the result estimated this time without re-executing processing in the image processing function 54.

If the estimation function 546 estimates that respiration of the patient P when the medical image has been captured has not been in the maximum inspiratory state, the processing function 548 may correct pixel values (CT values) of the medical image, for example, using a predetermined method. For example, the processing function 548 may, for example, multiply current pixel values (CT values) of the medical image by a predetermined coefficient, or add a predetermined constant pixel value (CT value) thereto. However, it is considered that the processing function 548 can perform more suitable correction when correcting the pixel values (CT values) of the medical image on the basis of the respiration phase estimated by the estimation function 546.

Next, an example of processing in a case where the processing function 548 corrects the pixel values (CT values) of the medical image captured this time to values equivalent to values at the time of maximum inspiratory state on the basis of the respiration phase estimated by the estimation function 546 will be described.

Figure 10:
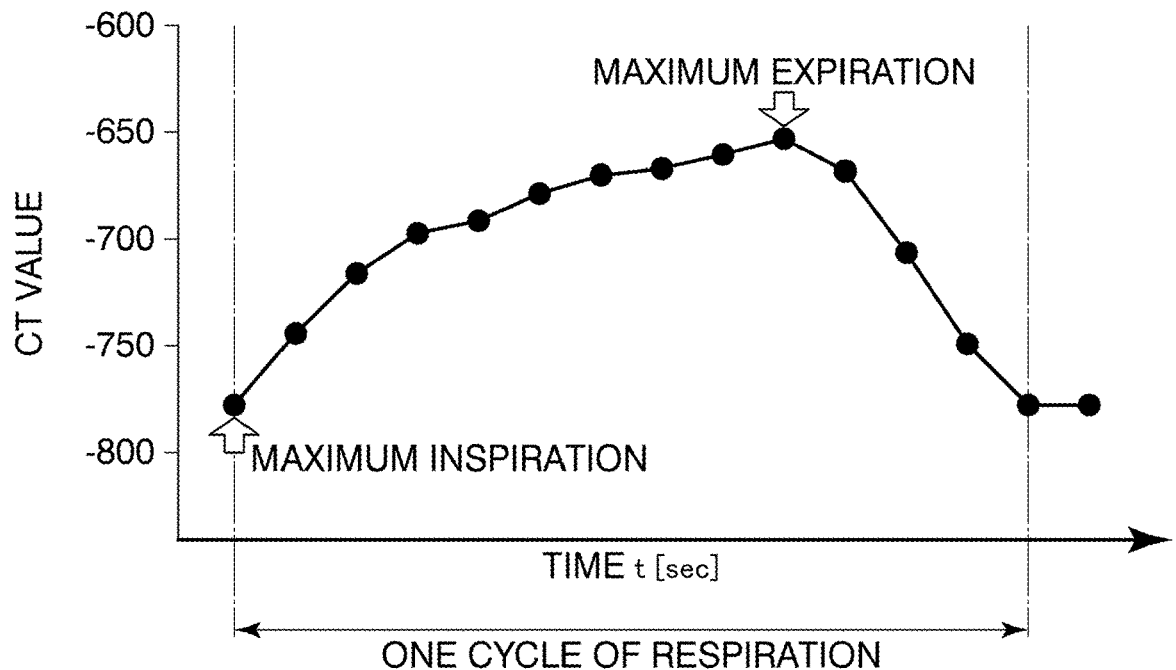
FIG. 10 is a diagram schematically showing an example of correction information used when CT values are corrected by a processing function included in the medical image processing apparatus according to the embodiment.

FIG. 10 is a diagram schematically showing an example of correction information used at the time of correcting a CT value by the processing function 548 included in the medical image processing apparatus (image processing function 54) according to the embodiment. FIG. 10 shows an example of a correction graph in which the time t of one cycle of respiration is associated with change in a CT value. The correction graph may be generated by collecting medical images captured in previous diagnoses and examinations performed on the patient P or may be generated by collecting medical images captured in diagnoses and examinations performed on a plurality of subjects (including patients different from the patient P). The correction graph may be, for example, knowledge in the field of research on diagnosis of pneumonia, or may be generated on the basis of this knowledge. The correction graph represents at least a CT value of the lung field area.

The processing function 548 corrects a CT value of the lung field area captured in the medical image captured this time such that the CT value of the medical image captured this time becomes a CT value at the time of maximum inspiratory state shown in the correction graph. More specifically, first, the processing function 548 obtains the difference between a CT value of the correction graph at the timing of the respiration phase estimated by the estimation function 546 and the CT value of the medical image captured this time. Subsequently, the processing function 548 adds the obtained CT value difference to the CT value of at least the lung field area of the medical image captured this time. Accordingly, even if the medical image captured this time is an image in which the captured lung field area is overall bright (CT value is low), the lung field area can be corrected to a brightness suitable for diagnosis, and a likelihood of erroneously diagnosing a healthy region as a pneumonia-affected region can be reduced. On the other hand, even if the medical image captured this time is an image in which the captured lung field area is overall dark (CT value is high), the lung field area can be corrected to a brightness suitable for diagnosis, and likelihood of erroneously diagnosing a pneumonia-effected region as a healthy region can be reduced.

Correction of the medical image in the processing function 548 is not limited to the method using the correction graph as shown in FIG. 10. For example, the processing function 548 may perform correction by multiplying the pixel values (CT values) of the medical image captured this time by a conversion coefficient predetermined corresponding to each time of one cycle of respiration. Correction of the medical image in the processing function 548 may be performed when the operator instructs execution of correction (when an operation indicating execution of correction is performed on the input interface 43) after the CT examination operator is notified that the medical image captured this time is not an image suitable for diagnosis.

The correction graph shown in FIG. 10 is merely an example, and any correction graph may be used as long as it can be used to correct the pixel values (CT values) of a medical image captured when respiration is not in the maximum inspiratory state to pixel values (CT values) equivalent to a medical image captured when respiration is in the maximum inspiratory state. Furthermore, as information used to correct pixel values (CT values), such as the correction graph, for example, a plurality of pieces of information depending on conditions related to the physique of the patient P, including whether the patient P is an adult or a child, male or female, and the like, may be provided. In this case, information used to correct pixel values (CT values) may be selected by the CT examination operator (a doctor, an engineer, or the like) from the plurality of pieces of information provided in advance by operating the input interface 43, or automatically selected on the basis of the physique (height, weight, sex, adult/child, and the like) of the patient P input through the input interface 43 at the time of CT examination.

Figure 11:
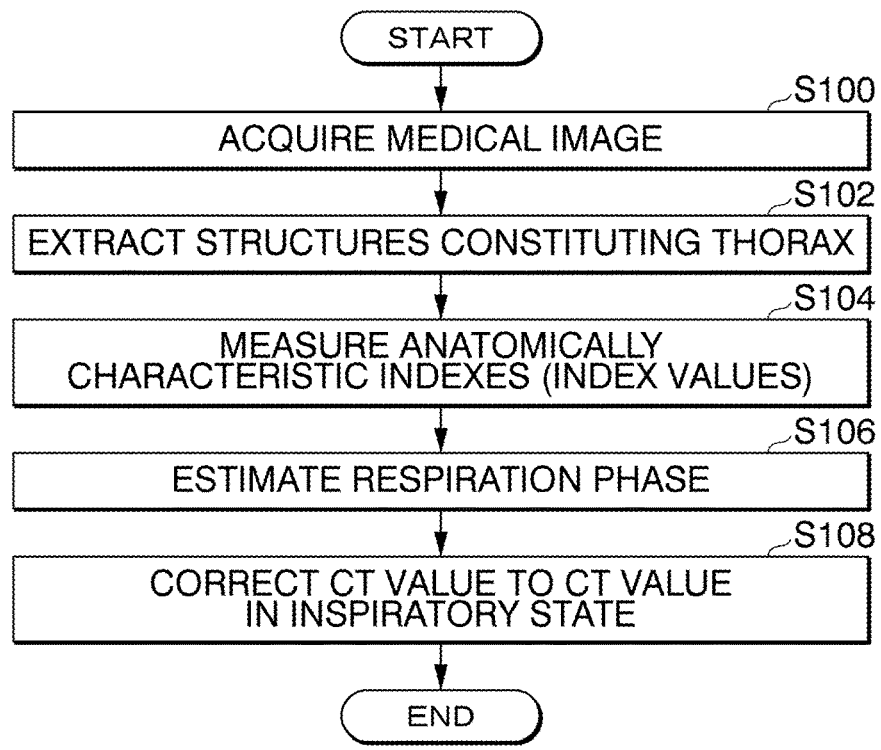
FIG. 11 is a flowchart showing an example of a series of flows of processing in the medical image processing apparatus according to the embodiment.

Next, an example of a flow of a series of processing executed by the image processing function 54 will be described. FIG. 11 is a flowchart showing an example of a flow of a series of processing in the medical image processing apparatus (image processing function 54) according to the embodiment. In the following description, it is assumed that captured medical images (CT images and cross-sectional images) are stored in the memory 41. In addition, it is assumed that the image processing function 54 estimates the respiration phase of the patient P and corrects CT values of medical images.

When the image processing function 54 starts processing, the acquisition function 542 acquires a medical image that is a current processing target stored in the memory 41 (step S100).

The extraction function 5442 extracts structures constituting the thorax of the patient P from the medical image acquired by the acquisition function 542 (step S102). The extraction function 5442 extracts extraction information such as extraction information α to extraction information γ on the basis of the extracted structures.

The measurement function 5444 measures anatomically characteristic indexes (index values) related to respiration of the patient P on the basis of the extraction information extracted by the extraction function 5442 (step S104). The measurement function 5444 obtains, for example, index values representing indexes such as index a to index h.

The estimation function 546 estimates a respiration phase of the patient P when the medical image has been captured on the basis of the index values obtained by the identification function 544 (step S106). More specifically, the estimation function 546 determines whether or not the index values satisfy each of the set conditions 1 to 7. Here, it is assumed that the index values do not satisfy any of the conditions, that is, the medical image captured this time is not an image of the maximum inspiratory state (respiration phase) of the patient P suitable for diagnosing pneumonia.

The processing function 548 corrects the CT value of the medical image to a CT value equivalent to the maximum inspiratory state of the patient P with reference to the respiration phase estimated by the estimation function 546 and, for example, the correction graph as shown in FIG. 10 (step S108).

In the flow of a series of processing described above, it is assumed that the image processing function 54 estimates the respiration phase of the patient P and corrects the CT value of the medical image. Meanwhile, in a flow of a series of processing in a case where the image processing function 54 determines whether or not respiration of the patient P when the medical image has been captured has been in the inspiratory state, and if the medical image is not a medical image captured in the maximum inspiratory state, the CT examination operator is notified of this, processing of steps S106 and S108 replaces or is add to corresponding processing. A flow of a series of processing in the image processing function 54 in this case can be easily conceived on the basis of the above-described flow of a series of processing. Therefore, a detailed description of the flow of a series of processing in this case will be omitted.

As described above, in the medical image processing apparatus of the embodiment, the respiratory state of a subject is estimated on the basis of shapes and positional relationships of anatomical regions (spine (thoracic vertebrae), ribs, sternum, the lower side of the lung field (diaphragm), intercostal muscles, etc.) constituting the thorax of the subject captured in a medical image. Moreover, in the medical image processing apparatus of the embodiment, the respiratory state (respiration phase) of the subject can be estimated from a medical image of at least one respiration phase, captured at an arbitrary timing (desirably, at a timing close to the maximum inspiratory state), without capturing medical images corresponding to one entire cycle of respiration of the subject.

Then, in the medical image processing apparatus of the embodiment, when it is determined that the estimated respiratory state is not a respiration phase (maximum inspiratory state) suitable for diagnosing pneumonia of the subject, an examination or diagnosis operator is notified of the determination result or medical image correction is performed. Accordingly, the medical image processing apparatus of the embodiment can reduce the possibility of erroneous examination or diagnosis due to the respiratory state of the subject captured in a medical image. Further, since the medical image processing apparatus of the embodiment issues a notification that the medical image is not an image suitable for diagnosis, an examination or diagnosis operator can determine the certainty of a diagnostic result obtained by diagnosis support software even when examination or diagnosis of the subject is performed using the diagnosis support software. On the other hand, in a case where the medical image processing apparatus of the embodiment corrects the medical image when the medical image is not suitable for diagnosis, for example, it is possible to ensure that the examination and diagnosis of the subject by the diagnosis support software are performed correctly.

Although an example of a case where the medical image processing apparatus is applied to an X-ray CT apparatus has been described in the above-described embodiment, this is merely an example, and a medical diagnostic apparatus to which the medical image processing apparatus is applied is not limited to the X-ray CT apparatus. For example, the medical image processing apparatus may be applied to medical diagnostic apparatuses such as a magnetic resonance imaging (MRI) apparatus and an X-ray imaging apparatus. The configuration, operation, and processing of the medical image processing apparatus in this case may be equivalent to the configuration, operation, and processing of the medical image processing apparatus of the above-described embodiment. Therefore, detailed description of the configuration, operation, and processing of the medical image processing apparatus applied to a medical diagnostic apparatus other than the X-ray CT apparatus will be omitted.

The above-described embodiment can be represented as follows.

A medical image processing apparatus including processing circuitry,
  wherein the processing circuitry is configured:
  to acquire a medical image of a lung field of a patient;
  to identify anatomical regions constituting the thorax of the patient on the basis of the medical image;
  to estimate a respiratory state when the medical image has been captured on the basis of the anatomical regions; and
  to execute processing based on the respiratory state.

According to at least one embodiment described above, it is possible to realize a medical image processing apparatus (image processing function) that estimates a respiratory state of a patient (P) based on a captured medical image in a medical diagnostic apparatus that performs examination and diagnosis of the patient (P) by acquiring a medical image of the lung field of the patient (P) (542), identifying anatomical regions constituting the thorax of the patient (P) based on the medical image (544), estimating a respiratory state when the medical image has been captured based on the anatomical regions (546), and executing processing based on the respiratory state (548).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
a memory storing medical images therein; and
processing circuitry including a hardware processor and configured to:
  acquire a medical image of a lung field of a patient from the medical images stored in the memory;
  identify anatomical regions constituting a thorax of the patient based on the acquired medical image;
  estimate a respiratory state including a respiratory phase of the patient at which the medical image has been captured, based on the identified anatomical regions; and
  execute processing including correction processing for correcting, based on the estimated respiratory phase, pixel values of pixels related to the lung field among pixels constituting the acquired medical image so that the pixel values of the pixels related to the lung field become equivalent to pixel values when respiration of the patient is in a maximum inspiratory state.

2. The medical image processing apparatus according to claim 1,
wherein the respiratory state represents whether respiration of the patient is in an expiratory state or an inspiratory state when the medical image has been captured, and
the processing circuitry is further configured to perform notification based on the respiratory state.

3. The medical image processing apparatus according to claim 2, wherein the processing circuitry is further configured to issue a notification at least that respiration of the patient when the medical image has been captured is not in a maximum inspiratory state.

4. The medical image processing apparatus according to claim 1,
wherein the anatomical regions are regions having geometrically changing shapes or relative positional relationships in expiration and inspiration of the patient, in the thorax, and
the processing circuitry is further configured to estimate the respiratory state based on index values relating to at least one of the shapes and the positional relationships of the anatomical regions.

5. The medical image processing apparatus according to claim 4, wherein the processing circuitry is further configured to estimate the index values, which are values representing angles formed by ribs in the patient.

6. The medical image processing apparatus according to claim 4, wherein the processing circuitry is further configured to estimate the index values, which are values representing distances between ribs in the patient.

7. The medical image processing apparatus according to claim 4, wherein the processing circuitry is further configured to estimate the index values, which are values representing angles formed by a sternum in the patient.

8. The medical image processing apparatus according to claim 4, wherein the processing circuitry is further configured to estimate the index values, which are values representing distances between a sternum and ribs in the patient.

9. The medical image processing apparatus according to claim 4, wherein the processing circuitry is further configured to estimate the index values, which are values representing a distance between a position of an upper edge of a diaphragm and a sternum in the patient.

10. The medical image processing apparatus according to claim 4, wherein the processing circuitry is further configured to estimate the index values, which are values representing a curvature of a diaphragm in the patient.

11. The medical image processing apparatus according to claim 4, wherein the processing circuitry is further configured to estimate the index values, which are values representing thicknesses of intercostal muscles in the patient.

12. The medical image processing apparatus according to claim 4, wherein the processing circuitry is further configured to estimate the index values, which are values representing an uneven shape of intercostal muscles in the patient.

13. The medical image processing apparatus according to claim 1, wherein in performing the correction processing, the processing circuitry is further configured to correct the pixel values of the pixels related to the lung field to pixel values at a time of maximum inspiration represented in a correction graph used as a reference of the respiratory state.

14. The medical image processing apparatus according to claim 1, wherein in performing the correction processing, the processing circuitry is further configured to obtain a difference between a reference value of correction information for medical images and a pixel value of a pixel related to the lung field, and add the difference to the pixel value of the pixel related to the lung field.

15. The medical image processing apparatus according to claim 1, wherein in performing the correction processing, the processing circuitry is further configured to multiply a pixel value of a pixel related to the lung field by a respective predetermined conversion coefficient corresponding to each time within a cycle of respiration used as a reference.

16. The medical image processing apparatus of claim 1, wherein the processing circuitry is further configured to control a display to display the medical image having the corrected pixel values.

17. A medical image processing method using a computer and a memory storing therein medical images, the method comprising:
  acquiring a medical image of a lung field of a patient from the medical images stored in the memory;
  identifying anatomical regions constituting a thorax of the patient based on the medical image;
  estimating a respiratory state including a respiratory phase of the patient at which the medical image has been captured, based on the identified anatomical regions; and
  executing processing including correction processing for correcting, based on the estimated respiratory phase, pixel values of pixels related to the lung field among pixels constituting the medical image so that the pixel values of the pixels related to the lung field become equivalent to pixel values when respiration of the patient is in a maximum inspiratory state.

18. A non-transitory computer-readable storage medium storing a program for causing a computer to execute:
acquiring a medical image of a lung field of a patient from medical images stored in a memory;
identifying anatomical regions constituting a thorax of the patient based on the medical image;
estimating a respiratory state including a respiratory phase of the patient at which the medical image has been captured, based on the identified anatomical regions; and
executing processing including correction processing for correcting, based on the estimated respiratory phase, pixel values of pixels related to the lung field among pixels constituting the medical image so that the pixel values of the pixels related to the lung field become equivalent to pixel values when respiration of the patient is in a maximum inspiratory state.

* * * * *